US011313351B2

(12) United States Patent
Post et al.

(10) Patent No.: US 11,313,351 B2
(45) Date of Patent: Apr. 26, 2022

(54) METHODS AND SYSTEMS OF ADVANCED YAW CONTROL OF A WIND TURBINE

(71) Applicant: WindESCo, Inc., Boston, MA (US)

(72) Inventors: Nathan L. Post, Malden, MA (US); Brendan F. Taylor, South Burlington, VT (US); Peter Bachant, Cambridge, MA (US); Jonathan A. Kossuth, Burlington, MA (US); Mohit Dua, Burlington, MA (US)

(73) Assignee: WindESCo, Inc., Boston, MA (US)

(*) Notice: Subject to any disclaimer, the term of this patent is extended or adjusted under 35 U.S.C. 154(b) by 0 days.

(21) Appl. No.: 17/361,365

(22) Filed: Jun. 29, 2021

(65) Prior Publication Data

US 2022/0010769 A1    Jan. 13, 2022

Related U.S. Application Data

(60) Provisional application No. 63/108,532, filed on Nov. 2, 2020, provisional application No. 63/051,243, filed on Jul. 13, 2020.

(51) Int. Cl.
*F03D 7/02* (2006.01)
*G01S 19/53* (2010.01)

(52) U.S. Cl.
CPC ............ *F03D 7/0204* (2013.01); *G01S 19/53* (2013.01); *F05B 2270/20* (2013.01);
(Continued)

(58) Field of Classification Search
CPC .... F03D 7/0204; G01S 19/53; F05B 2270/20; F05B 2270/32; F05B 2270/321; F05B 2270/329
See application file for complete search history.

(56) References Cited

U.S. PATENT DOCUMENTS 7,299,627 B2    11/2007    Corten et al.
7,551,130 B2     6/2009    Altenschulte
(Continued)

FOREIGN PATENT DOCUMENTS

CN    105335617 A    2/2016
DK    201470456 A1    5/2015
(Continued)

OTHER PUBLICATIONS

Howland et al Wind farm power optimization through wake steering Jul. 16, 2019 downloaded Sep. 14, 2021 https://www.ncbi.nlm.nih.gov/pubmed/31262816.
(Continued)

*Primary Examiner* — Sean Gugger
(74) *Attorney, Agent, or Firm* — Eric L. Lane; Green Patent Law

(57) ABSTRACT

Embodiments of the present disclosure include a retrofit auxiliary nacelle yaw position control system that enables advanced nacelle yaw position control of a wind turbine by comparing a desired nacelle yaw position signal with the actual nacelle yaw position and generating a virtual relative wind direction signal that is provided to the existing turbine control unit. This method and system enable implementation of wake steering, collective yaw optimization and dynamic yaw optimization of a collection of wind turbines referred to as a wind plant. Modification of the existing turbine control unit is not required, greatly simplifying the implementation process of advanced yaw control strategies on existing wind plants.

16 Claims, 14 Drawing Sheets

(52) U.S. Cl.
CPC ..... *F05B 2270/32* (2013.01); *F05B 2270/321* (2013.01); *F05B 2270/329* (2013.01)

(56) References Cited

U.S. PATENT DOCUMENTS

| | | | |
|---|---|---|---|
| 7,883,316 B2 | 2/2011 | Kildegaard | |
| 7,941,304 B2 | 5/2011 | Gundling | |
| 7,952,215 B2 | 5/2011 | Hayashi et al. | |
| 8,058,740 B2 | 11/2011 | Altenschulte | |
| 8,267,655 B2 | 9/2012 | Loh et al. | |
| 8,332,077 B2 | 12/2012 | Kndo et al. | |
| 9,201,410 B2 | 12/2015 | Ambekar et al. | |
| 9,429,143 B2 | 8/2016 | Lee | |
| 9,512,820 B2 | 12/2016 | Obrecht | |
| 9,551,322 B2 | 1/2017 | Ambekar et al. | |
| 9,617,975 B2 | 4/2017 | Attia | |
| 9,760,069 B2 | 9/2017 | Betran Palomas | |
| 9,835,138 B2 | 12/2017 | Westergaard | |
| 10,006,438 B2 | 6/2018 | de Boer | |
| 10,024,304 B2 | 7/2018 | Lee | |
| 10,100,813 B2 | 10/2018 | Ravindra et al. | |
| 10,138,873 B2 | 11/2018 | Gregg et al. | |
| 10,247,171 B2 | 4/2019 | Petitjean et al. | |
| 10,364,796 B2 | 7/2019 | Brath et al. | |
| 10,415,545 B2 | 9/2019 | Kjaer et al. | |
| 2009/0099702 A1 | 4/2009 | Vyas et al. | |
| 2009/0299780 A1 | 12/2009 | Sarkar et al. | |
| 2009/0317250 A1* | 12/2009 | Gamble | F03D 1/0658 416/1 |
| 2010/0092289 A1 | 4/2010 | Altenschulte | |
| 2010/0140936 A1 | 6/2010 | Benito et al. | |
| 2010/0143128 A1 | 6/2010 | McCorkendale | |
| 2012/0263591 A1 | 10/2012 | Kwong | |
| 2012/0263592 A1 | 10/2012 | Lind | |
| 2013/0103202 A1 | 4/2013 | Bowyer et al. | |
| 2013/0255363 A1 | 10/2013 | Merida et al. | |
| 2013/0300115 A1 | 11/2013 | Seem et al. | |
| 2014/0112777 A1 | 4/2014 | Kalra et al. | |
| 2014/0167415 A1 | 6/2014 | Mykhaylyshyn | |
| 2014/0327904 A1 | 11/2014 | Bossert | |
| 2014/0348650 A1* | 11/2014 | Hansen | F03D 7/0204 416/1 |
| 2015/0086357 A1 | 3/2015 | Gregg | |
| 2015/0240783 A1* | 8/2015 | Kii | F03D 7/0204 290/44 |
| 2016/0146188 A1 | 5/2016 | Matsuda et al. | |
| 2016/0377056 A1 | 12/2016 | Irvine | |
| 2018/0010576 A1* | 1/2018 | Brake | F03D 7/048 |
| 2018/0238303 A1 | 8/2018 | de Boer et al. | |
| 2018/0372070 A1 | 12/2018 | Vital Amuchastegui et al. | |
| 2018/0372886 A1* | 12/2018 | Weber | G01S 19/14 |
| 2019/0010923 A1 | 1/2019 | Dua et al. | |
| 2019/0032641 A1 | 1/2019 | Stoltenjohannes | |
| 2019/0120209 A1 | 4/2019 | Geisler et al. | |
| 2019/0170118 A1 | 6/2019 | Kiles et al. | |
| 2020/0102932 A1* | 4/2020 | Hovgaard | F03D 7/042 |

FOREIGN PATENT DOCUMENTS

| | | |
|---|---|---|
| EP | 2674616 A2 | 12/2013 |
| EP | 2685094 A2 | 1/2014 |
| FR | 3069663 A1 | 2/2019 |
| JP | 2011/007085 B2 | 1/2011 |
| JP | 2016/070085 A | 5/2016 |
| KR | 10-2015-0018060 A | 2/2015 |
| WO | WO 2004/111446 A1 | 12/2004 |
| WO | WO 2012/013195 A2 | 2/2012 |
| WO | WO 2012/066223 A1 | 5/2012 |
| WO | WO 2012/129435 A2 | 9/2012 |
| WO | WO 2014/056725 A1 | 4/2014 |
| WO | WO 2014/104978 A1 | 7/2014 |
| WO | WO 2015/079221 A2 | 6/2015 |
| WO | WO 2015/097795 A1 | 7/2015 |
| WO | WO 2015/129015 A1 | 9/2015 |
| WO | WO 2015/136687 A1 | 9/2015 |
| WO | WO 2016/184915 A1 | 11/2016 |
| WO | WO 2016/200277 A1 | 12/2016 |
| WO | WO 2018/007012 A1 | 1/2018 |

OTHER PUBLICATIONS

Abraham et al Dynamic wake modulation induced by utility-scale wind, Jan. 1, 2020, downloaded Sep. 14, 2021 https://arxiv.org/pdf/1905.02775.

Kanev, On the Robustness of Active Wake Control to Wind Turbine, Aug. 16, 2019 downloaded Sep. 14, 2021 https://www.mdpi.com/1996-1073/12/16/3152/pdf.

Herges, Results from the SWiFT Wake Steering Experiment Aug. 29, 2013 downloaded Sep. 14, 2021 https://www.osti.gov/servlets/purl/1583081pdf.

Stanford study shows how to improve production at wind farms Jul. 17, 2019 downloaded Sep. 14, 2021 https://www.nsf.gov/discoveries/disc_summ.jsp?cntn_id=298890&org=NSF&from=news.

Simley et al Design and analysis of a wake steering controller with wind Apr. 8, 2020 downloaded Sep. 14, 2021 https://www.wind-energ-sci.net/5/451/2020/.

Annoni, Analysis of Control-Oriented Wake Modeling Tools Using Lidar Field Results Nov. 1, 2018 downloaded Sep. 14, 2021 https://wes.copernicus.org/articles/3/819/2018/.

• Wake Adapt solution—Siemens Gamesa Nov. 14, 2019 downloaded Sep. 14, 2021 https://www.youtube.com/watch?v=UP2yJqGQ2FU.

Point vortex transportation model for yawed Mar. 2020 down Sep. 2021 https://www.cambridge.org/core/journals/journal-of-fluid-mechanics/article/abs/point-vortex-transportation-model-f.

Fleming, Field test of wake steering at an offshore wind farm Feb. 6, 2017 downloaded Sep. 14, 2021 https://www.osti.gov/biblio/1343393.

Fleming, Full-scale field test of wake steering 2017 downloaded Sep. 14, 2021 https://iopscience.iop.org/article/10.1088/1742-6596/854/1/012013/meta.

Fleming, Detailed field test of yaw-based wake steering 2016 downloaded Sep. 14, 2021 https://iopscience.iop.org/article/10.1088/1742-6596/753/5/052003/meta.

Raach, Lidar-based wake tracking for closed-loop wind farm control 2016 downloaded Sep. 14, 2021 https://iopscience.iop.org/article/10.1088/1742-6596/753/5/052009/meta.

Fleming A simulation study demonstrating the importance of large-scale trailing vortices in wake steering May 14, 2018 downloaded Sep. 14, 2021 https://www.osti.gov/biblio/1416256.

White, Estimation of rotor loads due to wake steering Jan. 7, 2018 downloaed Sep. 14, 2021 https://arc.aiaa.org/doi/pdf/10.2514/6.2018-1730.

Annoni, Analysis of control-oriented wake modeling tools using lidar field results Nov. 1, 2018 downloaded Sep. 14, 2021 https://www.osti.gov/biblio/1481841.

Quick, Optimization under uncertainty for wake steering strategies 2017 downloaded Sep. 14, 2021 https://iopscience.iop.org/article/10.1088/1742-6596/854/1/012036/meta.

Howland, Wind farm power optimization through wake steering Jul. 16, 2019 downloaded Sep. 14, 2021 https://www.pnas.org/content/116/29/14495.short.

Fleming, Initial results from a field campaign of wake steering applied at a commercial wind farm—Part 1 May 20, 2019 downloaded Sep. 14, 2021 https://www.osti.gov/biblio/1518586.

Application of a LES technique to characterize the wake deflection of a wind turbine Sep. 2010 downloaded Sep. 14, 2021 https://onlinelibrary.wiley.com/doi/abs/10.1002/we.380.

Dahlberg et al, Potential improvement of wind turbine array efficiency by active wake control, Proc. European Wind Energy Conf, Madrid ,2003.

Medici, Experimental Studies of Turbine Wakes: Power Optimisation and Meandering, Tech Reports form KTH Mechanics, Dec. 2005.

Parkin P application of PIV to wake of a wind turbine in yaw, Sep. 9, 2001, DLR Mitteilung, http://www.diva-portal.org/smash/record.jsf?pid=diva2%3A14556&dswid=—download Sep. 13, 2021.

(56) References Cited

OTHER PUBLICATIONS

Xia, Wind Farm "wake steering": small re-alignments of turbines can increase . . . Jul. 9, 2019, downloaded Sep. 13, 2021, https://energypost.eu/wind-farm-wake-steering-small-re-alignments-o.

Archer Wake steering via yaw control in multi-turbine wind farms: Recommendat Mar. 2, 2019 https://www.sciencedirect.com/science/article/pii/S2213138818306544, downloaded Sep. 13, 2021.

Bossanyi, combining induction control and wake steering for wind farm, 2018, downloaded Sep. 13, 2021 http://iopscience.iop.org/article/10.1088/1742-6596/1037/3/032011/pdf.

Fairley, Algorithms help turbines share the wind, Jul. 1, 2019, downloaded Sep. 13, 2021 https://spectrum.ieee.org/energywise/green-tech/wind/teaching-wind-turbines-wake-steering.

Howland, Wind farm power optimization through wake, Jul. 2019, down Sep. 13, 2021 https://www.researchgate.net/publication/334166834_Wind_farm_power_optimization_through_wake_steering.

Su et al, Turbine Wake Steering, 2016, downloaded Sep. 13, 2021 http://blisslab.pratt.duke.edu/research/turbine-wake-steering.

White et al, Estimation of Rotor Loads Due to Wake Steering—osti.gov, Dec. 1, 2017, downloaded Sep. 13, 2021 https://www.osti.gov/servlets/purl/1486995.

Bay et al, Unlocking the Full Potential of Wake Steering, May 7, 2019, downloaded Sep. 13, 2021 https://www.wind-energ-sci-discuss.net/wes-2019-19/wes-2019-19.pdf.

Archer, Wake steering via yaw control in multi-turbine wind farms, Feb. 11, 2019, downloaded Sep. 13, 2021 https://pdf.sciencedirectassets.com/282793/1-s2.0-S2213138819X0003X/1-s2.0-S221.

Xia, Steering wind power in a new direction, Jul. 1, 2019, downloaded Sep. 13, 2021 https://news.stanford.edu/2019/07/01/steering-wind-power-new-direction/.

Wake Steering Performance Evaluated at Scale, May 20, 2019, downloaded Sep. 13, 2021 https://www.energy.gov/eere/wind/articles/wake-steering-performance-evaluated-scale.

Su, A numerical study of tilt-based wake steering using a hybrid, 2019, downloaded Sep. 13, 2021 https://onlinelibrary.wiley.com/doi/abs/10.1002/we.2426.

Optimization Under Uncertainty for Wake, Jun. 13, 2017, downloaded Sep. 13, 2021 https://www.osti.gov/servlets/purl/1373674.

Wind turbine wake position detection, Jun. 2019, downloaded Sep. 13, 2021, https://www.researchgate.net/publication/333612122_Wind_turbine_wake_position_detection_and_rotor_speed-based.

Optimization Under Uncertainty for Wake Steering Strategies, May 2017, downloaded Sep. 13, 2021 https://scholarsarchive.byu.edu/facpub/1871/.

Researchers use wake steering Aug. 7, 2019, down Sep. 13, 2021 https://www.sustainabilitymatters.net.au/content/energy/article/researchers-use-wake-steering-to-optimise-wind-farm-91531.

Fleming, From wake steering to flow control, Nov. 22, 2017, downloaded Sep. 13, 2021 https://pdfs.semanticscholar.org/e535/d684f435aed52fd2da8f1464b09c897e6c41.pdf.

Gebraad, Maximization of the annual energy production of wind power plants 2016 downloaded Sep. 14, 2021 https://onlinelibrary.wiley.com/doi/abs/10.1002/we.1993.

El-Asha, Quantification of power losses due to wind turbine wake interactions Jun. 2017 downloaded Sep. 14, 2021 https://onlinelibrary.wiley.com/doi/abs/10.1002/we.2123.

Su, A numerical study of tilt-based wake steering using a hybrid free-wake method Feb. 2020 downloaded Sep. 14, 2021 https://onlinelibrary.wiley.com/doi/abs/10.1002/we.2426.

Bay, Active power control for wind farms using distributed model predictive control 2018 downloaded Sep. 14, 2021 https://ieeexplore.ieee.org/abstract/document/8431764/.

Fleming, Investigation into the shape of a wake of a yawed full-scale turbine 2018 downloaded Sep. 14, 2021 https://iopscience.iop.org/article/10.1088/1742-6596/1037/3/032010/meta.

Hulsman, Optimizing Wind Farm Control through Wake Steering Mar. 5, 2020 downloaded Sep. 14, 2021 https://pdfs.semanticscholar.org/abac/def8f6903fc632231c9d31b0f2d3cc8b0b7f.pdf.

Wind turbine and wind farm 2019 down Sep. 14, 2021 https://galileo-masters.eu/winner/wind-turbine-and-wind-farm-operation-with-differential-satellite-positioning-system-support/.

Structural vibration monitoring of wind turbines Jun. 2014 downloaded Sep. 14, 2021 https://paginas.fe.up.pt/~eurodyn2014/CD/papers/512_MS25_ABS_1738.pdf.

Motion tracking of a wind turbine Jun. 2018 down Sep. 14, 2021 https://www.researchgate.net/publication/325870081_Motion_tracking_of_a_wind_turbine_blade_during_lifting_using_RTK-GPS.

Challenges in gps receiver design May 24, 2011 downloaded Sep. 14, 2021 https://repository.tudelft.nl/islandora/object/uuid:2dd6e471-883a-4f99-aaa8-a433eeeaa76d/datastream/OBJ/download.

Maes, Motion tracking of a wind turbine blade during lifting using RTK-GPS/I 2018 downloaded Sep. 14, 2021 https://lirias.kuleuven.be/retrieve/516588.

Su, hybrid free wake simulation comparison of turbine wake steering Jun. 2017 down Sep. 14, 2021, https://www.researchgate.net/publication/319166525_A_Hybrid_Free_Wake_Simulation_Comp.

Archer, Wake steering via yaw control in multi-turbine wind farms Jun. 2019 downloaded Sep. 14, 2021 https://www.sciencedirect.com/science/article/pii/S2213138818306544.

Fleming, From wake steering to flow control Nov. 22, 2017 downloaded Sep. 14, 2021 https://d-nb.info/1145297633/34.

Bossanyi, Combining induction control and wake steering for wind farm energy 2018 downloaded Sep. 14, 2021 https://iopscience.iop.org/article/10.1088/1742-6596/1037/3/032011/meta.

Su new hybrid free-wake model for wind turbine 2017 downloaded Sep. 14, 2021 https://dukespace.lib.duke.edu/dspace/bitstream/handle/10161/16390/Su_duke_0066D_14356.pdf?sequence=1.

Wind tunnel experiments on wind turbine wakes in yaw May 16, 2018 downloaded Sep. 14, 2021 https://nmbu.brage.unit.no/nmbu-xmlui/bitstream/handle/11250/2586762/Schottler.pdf?sequence=1.

Bay, Unlocking the full potential of wake steering May 7, 2019 downloaded Sep. 14, 2021 https://pdfs.semanticscholar.org/b18f/e964f17e653e46dfa7848210d0d5e8649031.pdf.

Annoni, Efficient optimization of large wind farms for real-time control 2018 downloaded Sep. 14, 2021 https://ieeexplore.ieee.org/abstract/document/8430751/.

A closed-loop wind farm control framework for maximization Aug. 2020 downloaded Sep. 14, 2021 https://www.sciencedirect.com/science/article/pii/S0960148120305358.

Castillo, Wind turbine wake position detection and rotor speed-based wake steering Jun. 4, 2019 down Sep. 14, 2021 https://journals.sagepub.com/doi/abs/10.1177/0309524X19852350.

International Search Report and Written Opinion dated Oct. 15, 2021 in related International Application No. PCT/US21/39475.

\* cited by examiner

METHODS AND SYSTEMS OF ADVANCED YAW CONTROL OF A WIND TURBINE

CROSS-REFERENCE TO RELATED APPLICATIONS

This application is a non-provisional of and claims priority to U.S. Patent Application No. 63/108,532, filed Nov. 2, 2020, and U.S. Patent Application No. 63/051,243, filed Jul. 13, 2020, each of which is hereby incorporated by reference in its entirety.

FIELD

The present disclosure relates to advanced yaw control of wind turbines.

BACKGROUND

Wind power is a major source of electricity with nearly 600 GW of global installed capacity at the end of 2018. This is expected to increase to nearly 800 GW in 2021. However, operating wind power projects and wind farms continue to underperform on power output by 9% on average. This, coupled with much higher than expected unscheduled maintenance costs caused mostly by a high component failure rate, is leading to lower revenue and higher operating expense. The industry is further challenged by reduction in incentives and subsidies as power prices continue to drop. Therefore, there is significant demand for systems to augment or retrofit existing wind turbines to improve energy production.

Most of the time multiple wind turbines are installed in relatively close proximity to one another to facilitate use of areas with good wind resources and efficient use of land, grid infrastructure and maintenance personnel. This collection of turbines is called a wind plant. As each turbine in a wind plant extracts energy from the air moving past it, the wind speed is reduced and turbulence is increased downstream of the turbine. This region of reduced windspeed is called the wake of the turbine. It has been known for some time that wake interactions between turbines in a wind plant result in significant losses in production of downstream turbines. One technique for reducing the impact of wakes on downstream turbines is to redirect the wakes away from those turbines by yawing the upstream turbine slightly away from perpendicular to the wind. This method of wake steering has been extensively studied in the scientific literature and is described in Brake and Scott and Obrecht. Typically, wake steering is attempted through a central control system.

A wind turbine is designed to convert mechanical power harvested from the air moving past the blades to electrical power. A typical wind turbine will attempt to maximize its electricity output based on measurements of the relative wind direction taken using instrument(s) mounted on the back of the nacelle. If the relative wind direction is not coming straight at the turbine within some predetermined relative wind direction range, then the turbine control unit will command the yaw drive to rotate until the relative wind direction is within the relative wind direction magnitude allowed. This system has several drawbacks: The turbine control unit is using a limited amount of information collected on the back of the nacelle, and ultimately it is always reactive rather than proactive. In addition, it has been shown that if an upwind turbine compromises its power production slightly by adjusting its yaw angle to steer wakes away from downwind turbines an increase in overall windfarm production is possible.

Most wind turbines as built do not have a mechanism to enable external control of the yaw position of the nacelle. In order to implement wake steering or any other advanced yaw control method on a wind plant some type of retrofit data communication and processing unit is required. Prior studies and systems have focused on implementing a dynamic offset of the relative wind direction measured by the turbine control unit.

Furthermore, nacelle yaw alignment with respect to true north must be calibrated when the wind turbine is installed via visual inspection or sensor calibration. Unfortunately, this calibration often drifts over time and re-calibration is required on a recurring basis. Discrepancies in yaw alignment can lead to faulty functioning of control algorithms that rely on this signal, including wake steering.

Thus, there is a need for more advanced systems and methods of yaw control for wind turbines. There is also a need for methods and systems that provide external control of the yaw position of the nacelle.

SUMMARY

Embodiments of the present disclosure alleviate to a great extent the disadvantages of known yaw control systems for wind turbines by closing the loop on nacelle yaw position using a virtual relative wind direction signal(s) to the turbine control unit and thus causing it to drive the yaw position to the desired optimum position. Disclosed systems and methods have a distinct advantage over current methodology in that they directly achieve the desired nacelle yaw position without the need to account for localized rapid variation in wind direction measured on the back of the nacelle. This approach also enables enhancement of yaw drive performance by responding faster or slower than the original turbine control unit to changing conditions, and it enables inclusion of additional sensor information from other turbines and measurement devices in determination of the optimum yaw angle of a turbine in a given set of environmental conditions. Additional contemporaneous measurements of the wind direction and velocity from a plurality of sensors in the region surrounding the retrofit turbine may be communicated to the system and incorporated to determine a desired nacelle yaw position that will optimize performance of the wind plant overall.

Embodiments of the disclosure are primarily intended to be employed as a retrofit system of an existing wind turbine as an enabling technology to allow wake steering, enhanced dynamic yaw optimization and collective yaw optimization algorithms to be implemented on a wind plant that was not originally built with these technologies. However, the techniques described for absolute nacelle yaw position measurement, closed loop nacelle yaw position control and dynamic nacelle yaw position optimization can also be incorporated into a new or retrofit data communication and processing unit directly. Exemplary embodiments use distributed or edge computing and distributed resource control for yaw control of wind farms to facilitate wake steering and power output optimization.

An additional application of the technology described herein is the system identification and subsequent site-specific optimization of the nacelle yaw position behavior by adjusting the yaw control parameters in the turbine control unit. These parameters may be adjusted so the system works optimally on own with its own sensors or with the virtual wind direction signal provided by the retrofit data communication and processing unit as a function of the nacelle yaw position commands determined by the wind plant optimization controller. When the retrofit data communication and processing unit does not receive a signal representing optimum nacelle yaw direction or is otherwise disabled, the relative wind direction signal from the wind direction sensor on the nacelle is provided directly to the turbine control unit. Thus, the optimal performance should be balanced when the turbine control unit is operating using the wind direction sensor and when it is operating with a virtual wind direction signal to achieve a commanded nacelle yaw position.

Exemplary embodiments include a system for retrofitting a wind turbine to enable enhanced yaw control to improve wind turbine or wind plant performance. An exemplary wind turbine includes a nacelle, a turbine control unit, and one or more wind direction sensors attached to the wind turbine. An exemplary retrofit system for a wind turbine comprises a retrofit data communication and processing unit configured to be communicatively coupled to the turbine control unit. The retrofit data communication and processing unit receives a first signal representing an initial nacelle yaw position of the wind turbine and a second signal representing a desired nacelle yaw position of the wind turbine. The retrofit data communication and processing unit provides auxiliary control over the wind turbine by disconnecting a relative wind direction signal traveling between the wind direction sensors and the turbine control unit, determining a virtual relative wind direction signal to cause the turbine control unit to drive the nacelle to the desired nacelle yaw position, and sending the virtual relative wind direction signal to the turbine control unit instead of the relative wind direction signal.

In exemplary embodiments, the retrofit system detects a sensor or communication fault or a power failure, and the retrofit data communication and processing unit communicatively couples the wind direction sensors directly to the turbine control unit such that the relative wind direction signal is sent to the turbine control unit. The wind direction sensors may continue to monitor relative wind direction after the relative wind direction signal is disconnected from the turbine control unit. The wind turbine may further comprise a windspeed sensor connected to the wind turbine, and the retrofit data communication and processing unit intercepts and receives windspeed signals from the windspeed sensor. The windspeed signal may be passed on to the turbine control unit unmodified or a virtual wind speed measurement may be generated to further modify the original turbine behavior.

In exemplary embodiments, if the wind direction sensors and/or windspeed sensor fail, the retrofit data communication and processing unit enables the wind turbine to continue operation using outside signals generated by additional wind turbines or additional sensors. The outside signals may be provided by the retrofit data communication and processing unit to the turbine control unit as virtual sensor signals. The retrofit system may further comprise two or more GNSS antennas and a differential GNSS receiver attached to the wind turbine, and the initial nacelle yaw position may be determined using the differential GNSS receiver to calculate a relative position vector between the two or more GNSS antennas.

An exemplary method of providing enhanced yaw control for a wind turbine including a nacelle, a turbine control unit, and one or more wind direction sensors attached to the wind turbine comprises receiving a first signal representing an initial nacelle yaw position of the wind turbine and receiving a second signal representing a desired nacelle yaw position of the wind turbine. Disclosed methods further comprise disconnecting a relative wind direction signal traveling between the one or more wind direction sensors and the turbine control unit. Exemplary methods further comprise determining a virtual relative wind direction signal to cause the turbine control unit to drive the nacelle to the desired nacelle yaw position and sending the virtual relative wind direction signal to the turbine control unit instead of the relative wind direction signal so the turbine control unit drives the nacelle to the desired nacelle yaw position.

In exemplary embodiments, when there is no signal received representing optimal nacelle yaw position or desired nacelle yaw position, the relative wind direction signal from the one or more wind direction sensors is provided directly to the turbine control unit so the wind turbine returns to the initial nacelle yaw position. Exemplary methods further comprise disconnecting a wind velocity signal traveling to the turbine control unit and providing a virtual wind velocity signal to the turbine control unit.

In exemplary methods, the virtual relative wind direction signal is determined using a circular difference between the initial nacelle yaw position and the desired nacelle yaw position as feedback error in a control loop. The desired nacelle yaw position may be determined using the relative wind direction signal, a wind speed signal, and the first signal representing the initial nacelle yaw position. Exemplary methods may further comprise incorporating operating condition data from one or both of: a plurality of additional wind turbine assemblies and a plurality of additional sensors to determine the desired nacelle yaw position. Disclosed methods may include automatically improving a control loop. Exemplary methods may further comprise preventing yawing of the wind turbine when the wind is not sufficient to start generating power.

In exemplary methods, the initial nacelle yaw position is determined using two or more Global Navigation Satellite System (GNSS) antennas and a differential GNSS receiver to calculate a relative position vector between the two or more GNSS antennas. More particularly, the (GNSS) antennas may be mounted at a fixed distance apart on the nacelle and a differential GNSS receiver may be used to determine a relative position vector between the GNSS antennas. This relative position vector projected on the horizontal plane plus a fixed offset then provides a nacelle yaw position signal which may be used directly or in combination with data from one or more additional sensors systems including an accelerometer, gyroscope, magnetic compass, and SCADA data to determine the nacelle yaw position signal relative to true north. Methods may further comprise analyzing data from the GNSS antennas and the differential GNSS receiver in combination with the initial nacelle yaw position signal to estimate the initial nacelle yaw position.

Exemplary embodiments include methods of optimizing the performance of a turbine control unit comprising disconnecting wind direction signals and wind speed signals from a turbine control unit and introducing a series of virtual wind direction signals and wind speed signals into the turbine control unit. Next, an exemplary method comprises measuring yaw position responses of a nacelle of a wind turbine to the series of virtual wind direction signals, modifying parameters of the turbine control unit, and repeating the series of virtual wind direction signals. The methods may include predicting the yaw position responses of the nacelle as a function of the series of virtual wind direction signals and the parameters of the turbine control unit and performing an optimization using historical operation data to reduce yaw movements and minimize errors between nacelle yaw position and wind direction.

Exemplary methods further comprise automatically generating parameter cases to be run such that parameter space is covered with a minimum number of steps. Additional input signals may be simulated and provided to the turbine control unit. In exemplary methods, the wind turbine is running during performance of the methods and true relative wind direction is kept within a predetermined range. Exemplary methods further comprise adjusting the parameters of the turbine control unit to achieve a desired nacelle yaw position when the turbine control unit is disconnected from a wind direction sensor and responds to a virtual wind direction signal.

In exemplary embodiments, it may be necessary to tune the retrofit data communication and processing unit based on the existing turbine control unit behavior to achieve the desired performance tracking the commanded nacelle yaw position. The turbine control unit system identification and subsequent tuning of the retrofit data communication and processing unit tuning may be performed when installed on the wind turbine prior to normal operation. Alternatively, in exemplary embodiments, the system identification and retrofit data communication and processing unit tuning is performed or updated in a continuous automated process throughout normal operation of the system. More particularly, additional contemporaneous measurements of the wind direction and velocity from a plurality of sensors in the region surrounding the retrofit turbine is incorporated to determine a desired nacelle yaw position that will optimize performance of the wind plant overall.

Exemplary embodiments of the disclosure further provide systems and methods of measuring nacelle yaw position using differential GPS/GNSS (Global Positioning System/Global Navigation Satellite System). More particularly, the present disclosure describes using differential GPS/GNSS for nacelle yaw direction measurement on wind turbines. Currently, differential GPS/GNSS is not utilized for nacelle yaw direction measurement on wind turbines. These techniques are used in other industries and such devices are often referred to as a "satellite compass." It should be noted that disclosed embodiments can utilize GPS and/or GNSS. Magnetometers which measure the earth's magnetic field could also be utilized in this application in combination with or in place of the differential GPS/GNSS system. Other instruments such as gyroscopes and accelerometers can also be utilized to further improve signal resolution and time response and enable short duration ride-through if the satellite signals are lost.

It should be noted that the embodiments and solutions described herein, when distributed and installed at a wind farm, come online, identify each other, and start working to optimize the wind farm operation autonomously, creating a "social" wind farm. Disclosed units "talk" with each other over either a wireless or wired communication network and do not necessarily have any outside information. If any single turbine or unit goes down or is otherwise not functioning correctly, the remainder would carry on without it. Optimization occurs through data sharing and arriving at a mutually agreed/beneficial optimization.

Accordingly, it is seen that advanced yaw control systems and methods are described which provide a virtual relative wind direction signal(s) to the turbine control unit and thus cause it to drive the yaw position to the desired optimum position. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Embodiments of the present disclosure generally provide methods and systems to modify the yaw position behavior of a wind turbine by intercepting the relative wind direction measurement signal between the sensor and the turbine control unit and providing a virtual wind direction signal to the turbine control unit to cause it to drive the yaw of the nacelle to the desired position.

Figure 1:
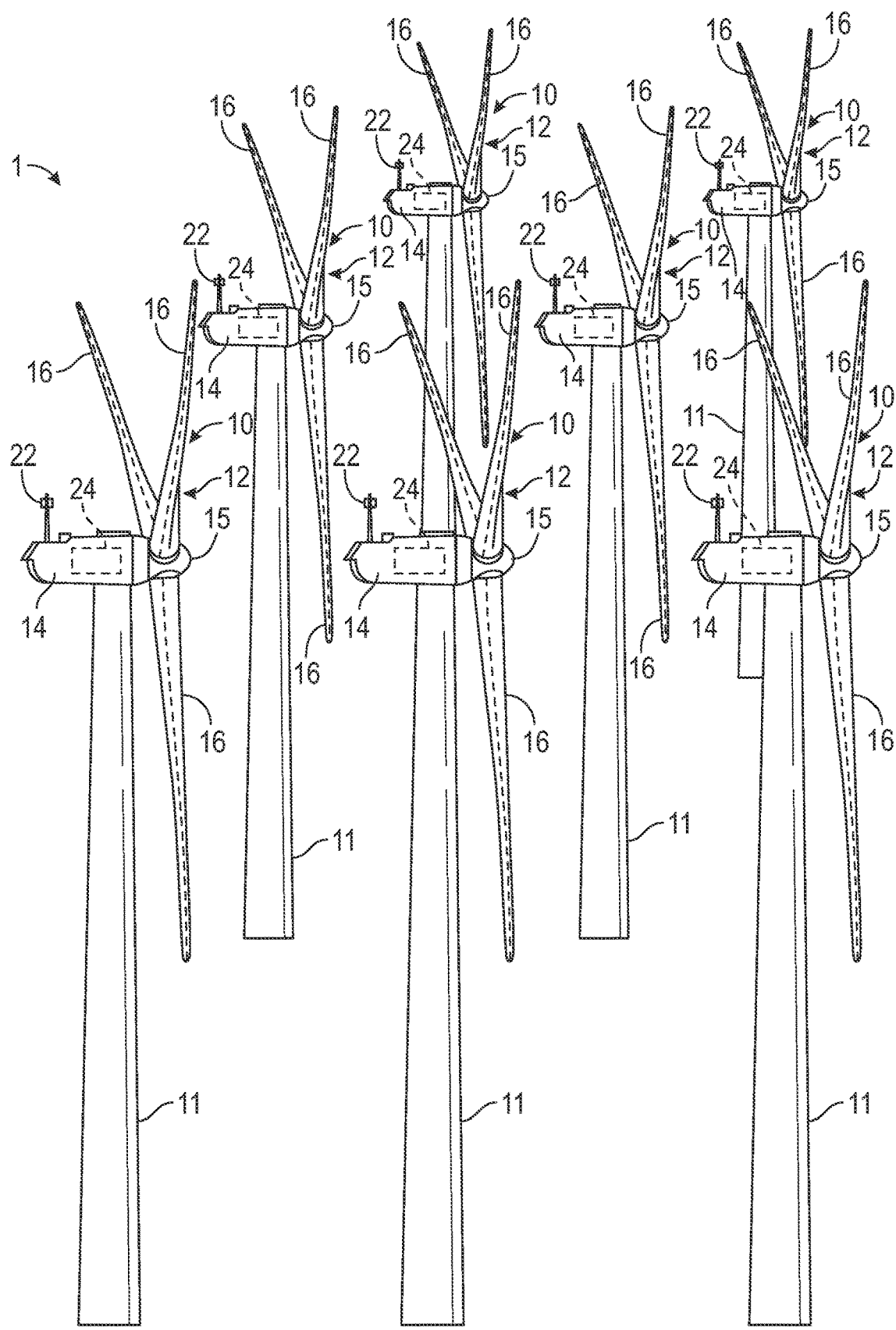
FIG. 1 is a perspective view of an exemplary embodiment of a wind plant in accordance with the present disclosure.
Figure 2:
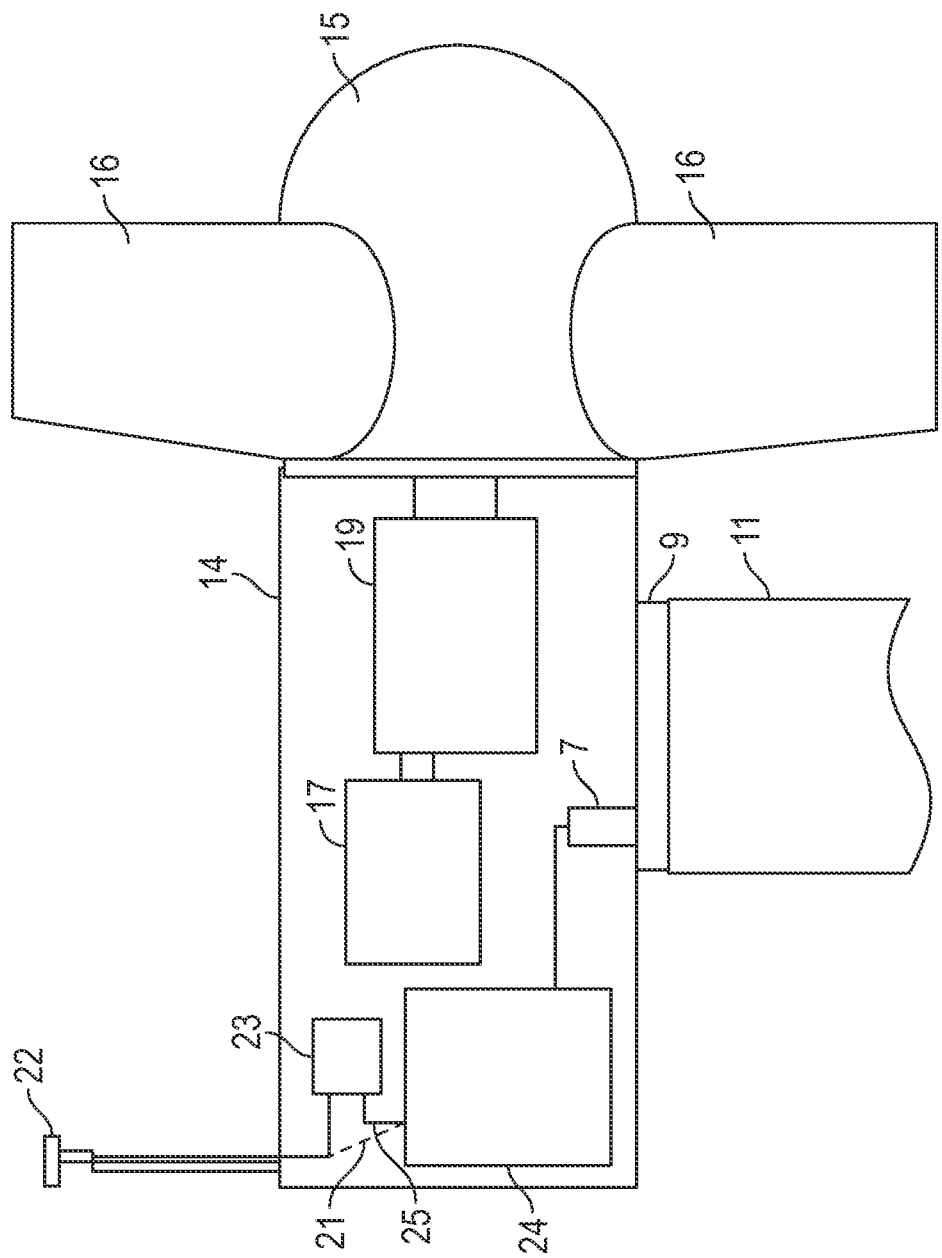
FIG. 2 is a side view of an exemplary embodiment of a wind turbine nacelle showing an exemplary retrofit system for a wind turbine including a retrofit data communication and processing unit installed between the existing wind direction sensor and the turbine control unit in accordance with the present disclosure.

An exemplary wind farm 1 is shown in FIG. 1. A wind farm or wind plant 1 includes a plurality of wind turbines 10. Each wind turbine 10 includes a tower 11 and a rotor 12 and a nacelle 14 mounted to the top of the tower 11 along with a yaw bearing 9. The rotor 12 has a plurality of rotor blades 16 coupled to and extending from a rotor hub 15. The rotor hub 15 is rotatably coupled to an electric generator 17 via the main shaft 3. FIG. 2 illustrates the major components in the nacelle 14. Various mechanical, electrical and computer systems, including but not limited to, the electric generator 17, a gearbox 19, a yaw motor 7, and a turbine control unit 24, may be housed in the nacelle 14. A retrofit data communication and processing unit 23 embodying the methods described in this disclosure may be added in the wind turbine.

Figure 3:
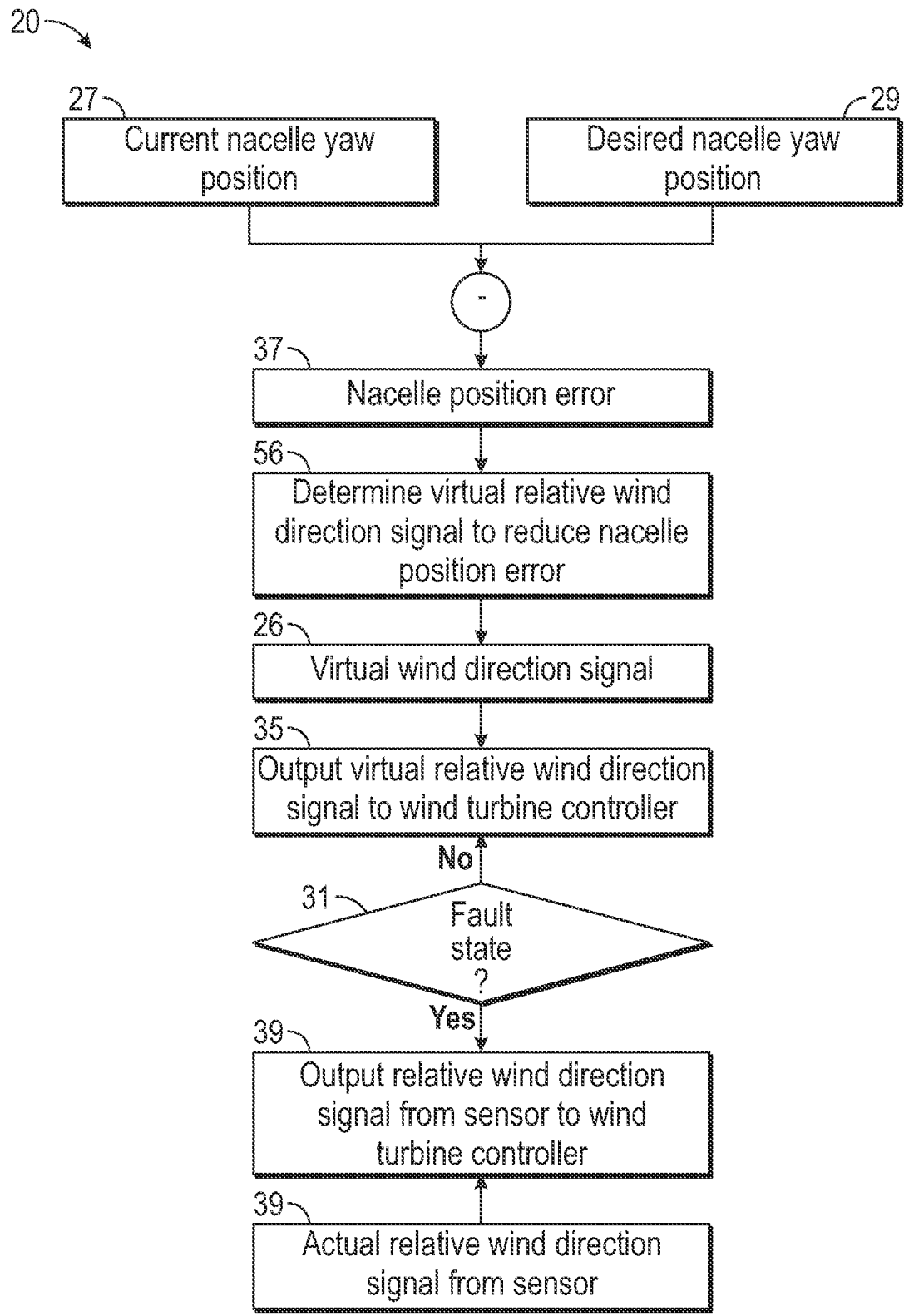
FIG. 3 is a flow chart diagram of an exemplary embodiment of a retrofit system for a wind turbine in accordance with the present disclosure.
Figure 4:
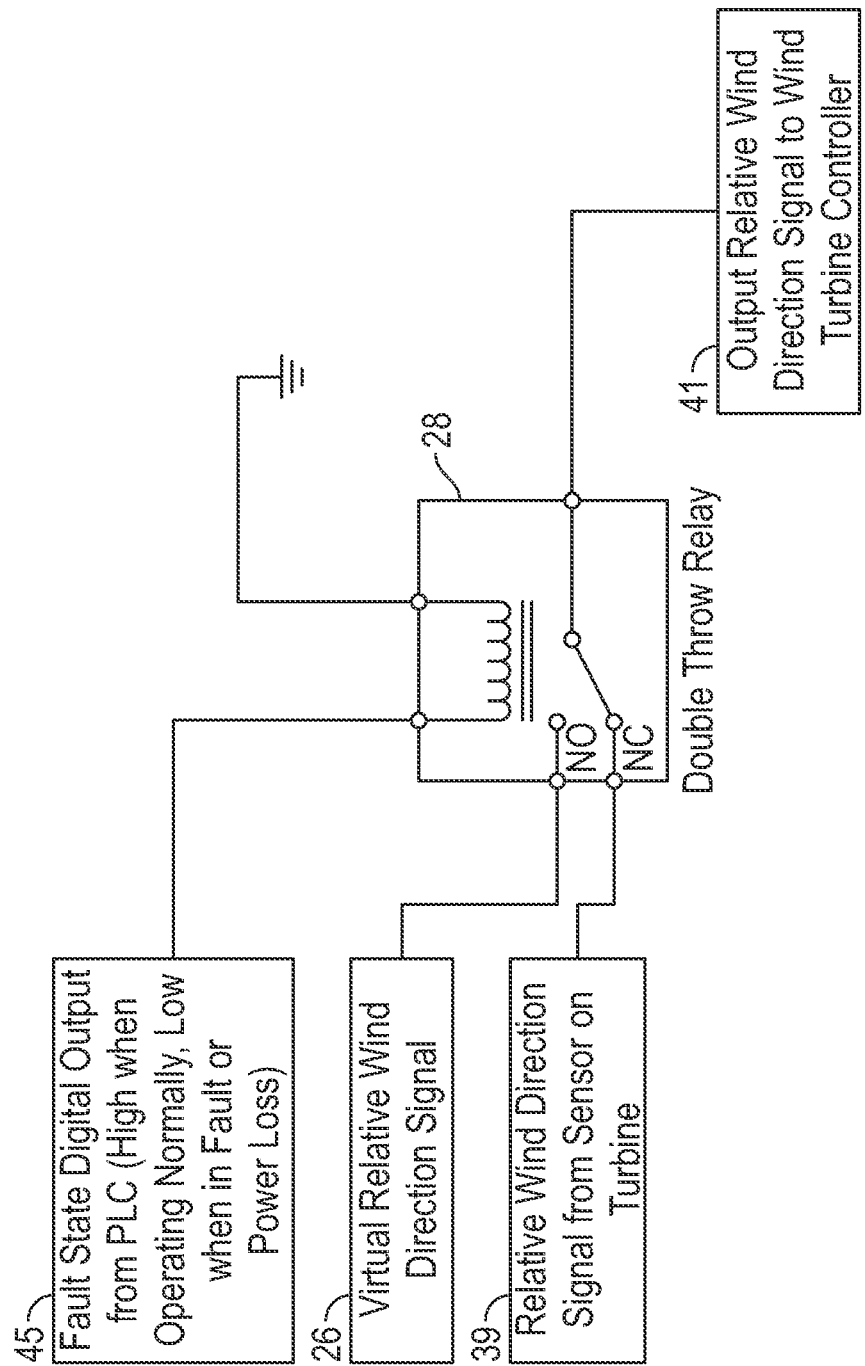
FIG. 4 is a schematic of an exemplary embodiment of a relay to ensure that the turbine can continue to operate in the event of a communication fault or loss of power in the retrofit system in accordance with the present disclosure.

An example flow chart of the information passing through an exemplary retrofit system and method 20 is shown in FIGS. 3 and 4. Typically, this system is implemented using electrical circuitry including a PLC or industrial computer (FIG. 12) to perform the necessary calculations, determine if a fault state exists 31, and provide fault state digital output 45. The retrofit system 20, also referred to as an auxiliary yaw position control system, implements advanced yaw control of the wind turbine 10 and is communicatively coupled to the turbine control unit 24. The system 20 includes a retrofit data communication and processing unit 23 to provide auxiliary control over the wind turbine 10. In exemplary embodiments, the retrofit data communication and processing unit 23 is installed between the wind direction sensor or sensors 22 and the turbine control unit 24.

The retrofit data communication and processing unit 23 receives a signal representing the initial nacelle yaw position 27 of the wind turbine 10. The original cable 21 (dashed line) between the sensor(s) 22 and the turbine control unit 24 may be disconnected from the turbine control unit 24 and connected to the retrofit system 20. This disconnects the virtual wind direction signal 26 between the wind direction sensors 22 and the turbine control unit 24. It should be noted that the wind direction sensors 22 may continue to monitor the relative wind direction after the they have been disconnected from the turbine control unit 24.

A second cable 25 then connects the retrofit system 20 to the turbine control unit 24 where it would normally receive the signal from the wind direction sensor 22. The retrofit data communication and processing unit 23 determines 56 a virtual wind direction signal 26 to cause the turbine control unit 24 to drive the nacelle 14 to the desired yaw position and continue operation of the wind turbine 10. The retrofit data communication and processing unit 23 receives the relative wind direction signal 39 from the sensor 22 and sends a virtual wind direction signal 26 determined from the current nacelle yaw position 27 and the desired nacelle yaw position 29 of the turbine 10 to the turbine control unit 24 in place of the relative wind direction signal 39. As discussed in more detail herein, the desired nacelle yaw position 29 may be computed using the relative wind direction, wind speed, and initial nacelle yaw position signals for the wind turbine 10 or based on a plurality of signals for the entire wind plant.

The virtual wind direction signal 26 provided by the retrofit system 20 behaves like the original relative wind direction signal 39 from the sensor 22 to the turbine control unit 24 using the same communication protocol and scaling as the original system such that the turbine control unit 24 cannot detect the difference. The above-described sequence can be performed when there is no signal representing optimum nacelle yaw position so the wind turbine 10 returns to the initial nacelle yaw position. Dither or noise may be added to the virtual wind direction signal 26 as required to make it sufficiently realistic for the turbine control unit 24.

Often wind direction measurements are combined with wind velocity and temperature measurements in one device called a sonic anemometer. When a sonic anemometer is used on a wind turbine, the retrofit system 20 also provides the windspeed and temperature signals through to the turbine control unit 24. A windspeed sensor could be provided, and the retrofit data communication and processing unit 23 intercepts and receives the windspeed sensor signals. Typically, these signals are passed through unmodified. However, a virtual signal could be provided instead, for example, to modify the turbine behavior or in the case of a failed wind direction sensor 22 on the turbine 10 by utilizing information from another source to provide the required information to the turbine control unit 24. More particularly, if any of the sensors 22 fail, the wind turbine 10 can continue to operate using signals generated by additional wind turbines 62 or additional sensors.

FIG. 4 shows the implementation of a relay circuit 28 to ensure that the actual signals from the relative wind direction sensor 22 on the turbine 10 are available to the turbine control unit 24 in the event of a fault or loss in communication of the retrofit system 20. Multi-pole relays and/or multiple relays may be used so that each required communication wire passes through a separate circuit. Should a fault state occur, such as a sensor or communication fault or a power failure, in exemplary embodiments the wind direction sensors 22 are electrically connected directly to the turbine control unit 24 so the relative wind direction signal 39 measured on the turbine will be provided to the turbine control unit 24 directly rather than the virtual wind direction signal 26 produced by the retrofit data communication and processing unit 23. Depending on the fault state, the output 41 would be either the relative wind direction signal 39 or the virtual wind direction signal 26.

Figure 5:
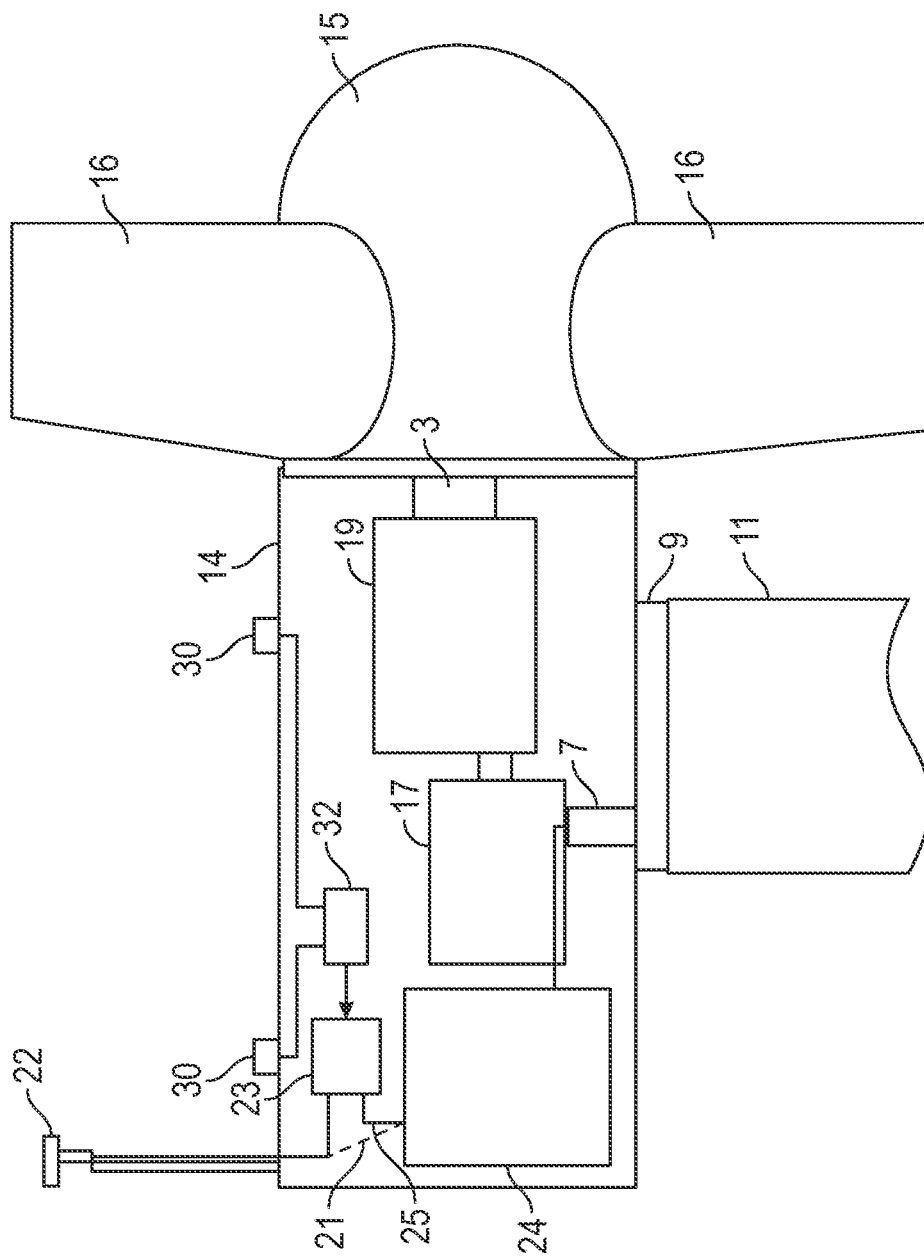
FIG. 5 is a side view of an exemplary turbine nacelle in accordance with the present disclosure with the addition of two GNSS antennas and a differential GNSS receiver that computes the relative position vector between the antennas to determine the current absolute nacelle yaw position of the turbine.
Figure 6:
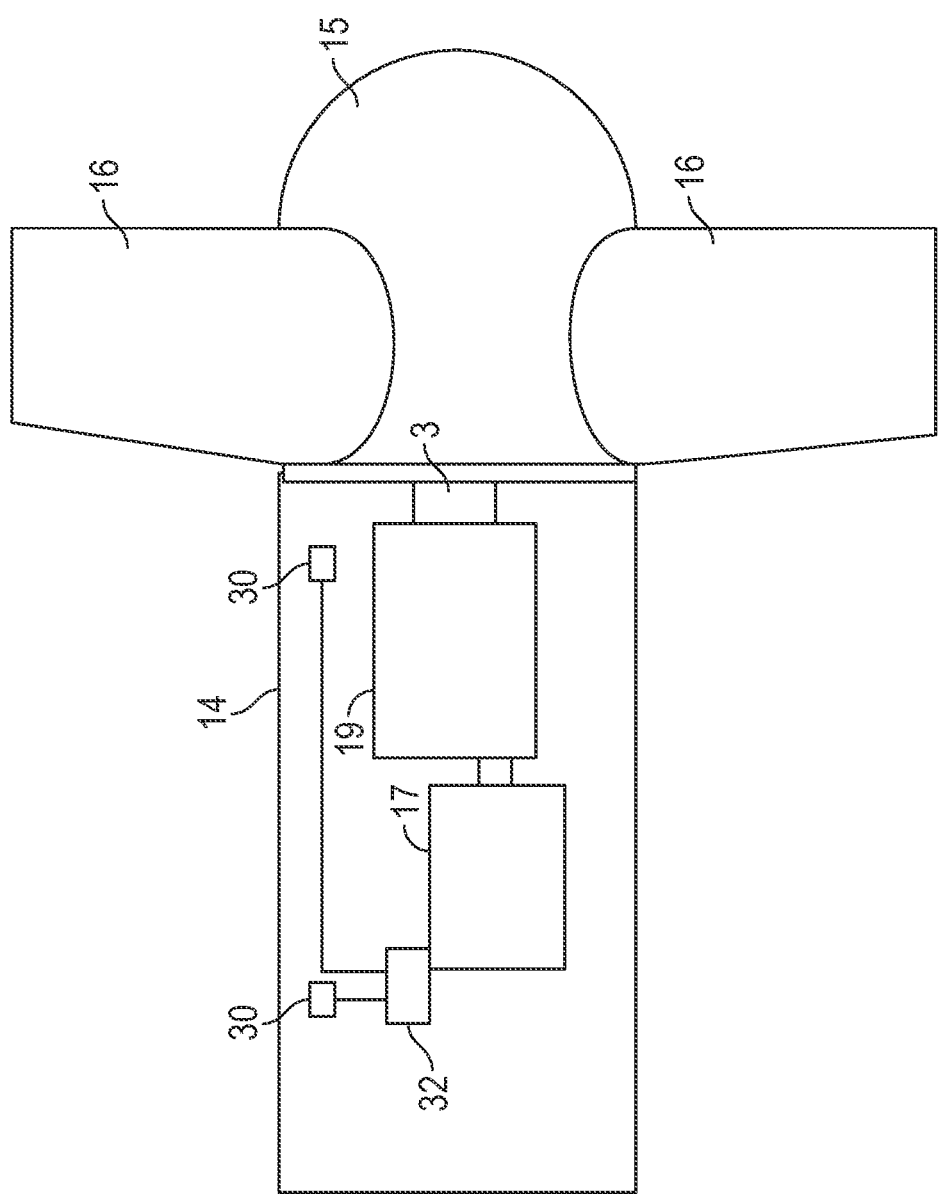
FIG. 6 is a top view of an exemplary nacelle in accordance with the present disclosure.

Referring now to FIGS. 5 and 6, an exemplary approach to determine the absolute nacelle yaw position is to measure the absolute nacelle yaw position directly using two or more GPS/GNSS antennas 30 positioned at some distance from one another connected to a single receiver 32. The receiver 32 operates in what is referred to as differential GNSS mode such that it computes the relative position of the two antennas 30 in a global framework based on the difference in the signal received from each satellite to each antenna. Differential GNSS is used in other industrial applications for determining the relative orientation and position of different components and may be referred to as a satellite compass, but nacelle orientation for a wind turbine 10 represents a new application of this technology. This technology enables determination of a highly accurate relative position vector between the antennas 30 and thus determination of the nacelle yaw position to within about 1-degree as long as the antennas 30 are placed a reasonable distance (0.5-2 meters typically) apart.

Exemplary embodiments of mounting positions for these antennas are shown in FIGS. 5 and 6 where the antennas are shown axially aligned parallel with the main shaft 3 of the wind turbine 10. However, the positions of the antennas could be varied depending on the conditions. The antennas 30 may be placed at any known orientation relative to the main shaft and the appropriate offset used in the control system 20 to determine the current yaw position 27. For instance, they may be placed perpendicular to the main shaft 3 of the turbine 10 or at any known angle that can be accounted for in the retrofit control system 20. In exemplary embodiments, GNSS antennas 30 are mounted at a fixed distance apart on the nacelle 14 and a differential GNSS receiver 32 is used to determine the relative position vector between the GNSS antennas 30. This may be done with a single GNSS receiver 32.

For the differential GNSS measurement of a wind turbine nacelle yaw position, antennas 30 may be mounted on a bracket that separates them a known distance and aligns the axis with the turbine 10. Accuracy of direction measurement improves with horizontal distance between antennas 30. Typically, 0.5-2 m is sufficient, 3 to 5 m is best and vertical distance between antenna mounts should be minimized. The antennas 30 may be mounted at any angle relative to the main shaft 3 (when viewed from above) as long as that angle is known and corrected for in software. In some implementations mounting perpendicular to the main shaft 3 might be more practical.

Figure 7:
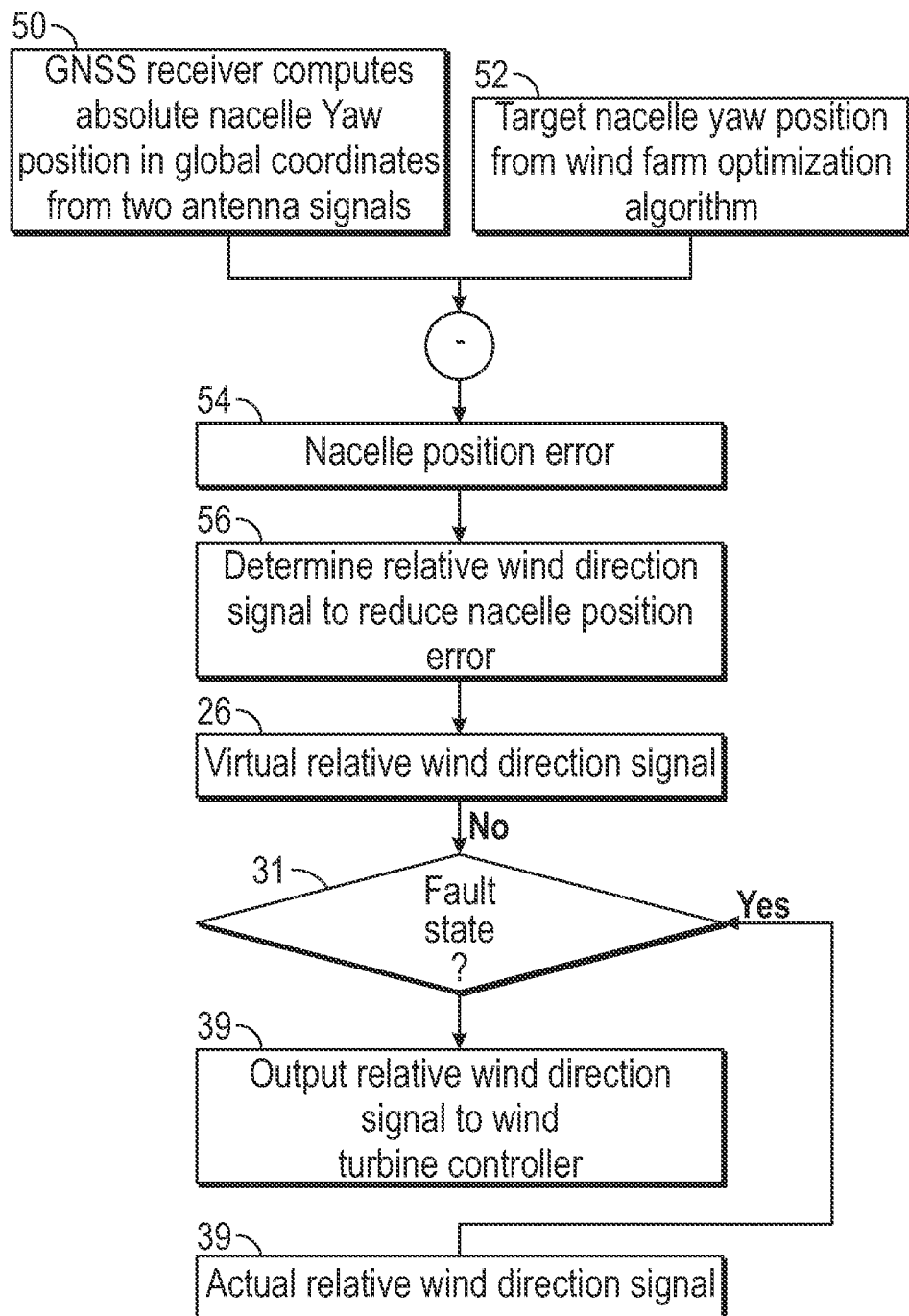
FIG. 7 is a flow chart of an exemplary control process for an exemplary retrofit data communication and processing unit using the GNSS receiver to determine the current nacelle yaw position in accordance with the present disclosure.
Figure 8:
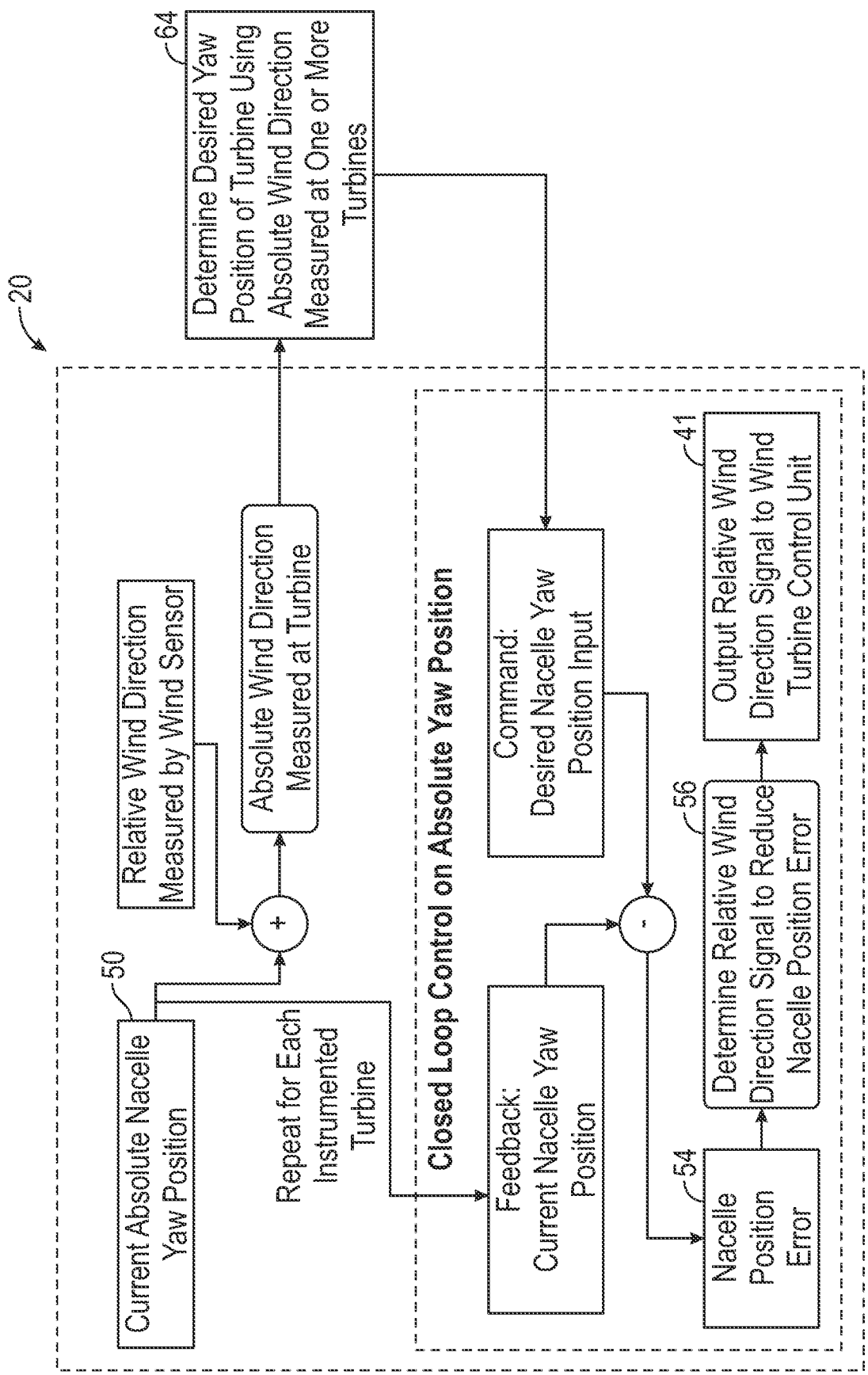
FIG. 8 is a flow chart of an exemplary overall wind plant control process as implemented in each turbine in accordance with the present disclosure.
Figure 9:
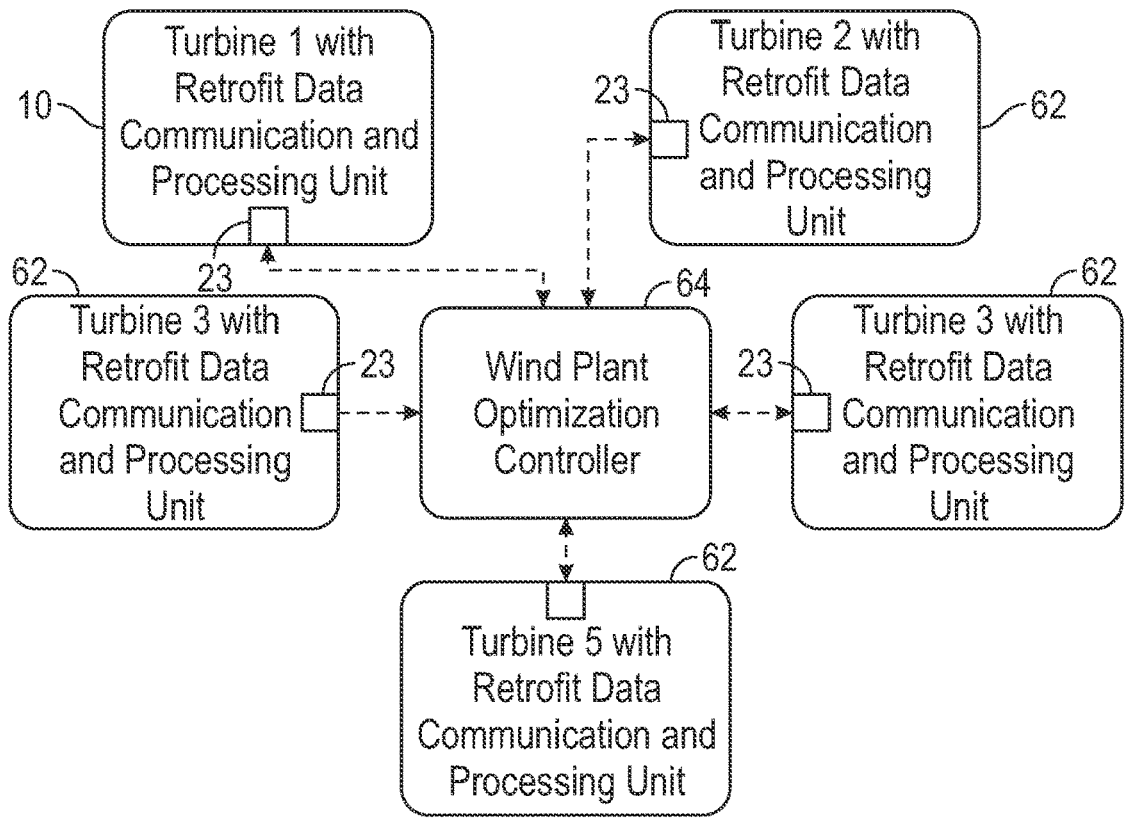
FIG. 9 is a schematic of an exemplary embodiment of a centralized wind plant controller to optimize the performance of the plant based on the signals received from each turbine and retrofit data communication and processing unit.

As shown in FIG. 7, along with the relative position of the two antennas 30 to determine nacelle yaw position, the GNSS receiver 32 may also provide a signal to the retrofit data communication and processing unit 23 or wind plant controller 64 indicating the position of the turbine 10 in global coordinates. This may then be used in the wind plant optimization setup rather than pre-programming the turbine locations. Additional instrumentation such as gyroscopes, accelerometers and magnetometers may be included to further improve the accuracy and reliability of the GNSS receivers 32. These signals may be used to detect and respond to other conditions on the turbine 10 such as excessive tower vibration.

In exemplary embodiments, absolute nacelle yaw position measurement 50 is performed using differential GNSS. For disclosed systems and methods to work correctly, they must know the current nacelle yaw position (feedback) signal. The response of the nacelle can be measured by SCADA data, gyroscopes, accelerometers, and/or differential GNSS. As discussed above, exemplary embodiments employ two GNSS antennas 32 mounted a certain distance apart and connected to the same receiver 32 that processes to calculate the vector between them. The two antennas 30 may be built into a single device that positions them at a precise distance apart, and then the entire device can be mounted on the turbine 10 at the desired orientation. The differential GNSS system advantageously provides the preferred <2 deg accuracy at an acceptable cost point. It should be noted that, in addition to measuring the nacelle yaw position accurately, the approximate location and altitude of the turbine 10 could also be measured in this way.

In exemplary embodiments, the differential GNSS system data may be analyzed to calibrate the nacelle yaw position measurement from SCADA, which may be a more reliable signal or both signals may be used in combination to determine the best current nacelle yaw position estimate. More particularly, the data from the GNSS antennas and the differential GNSS receiver are analyzed in combination with the initial nacelle yaw position signal to estimate the initial nacelle yaw position.

Figure 10:
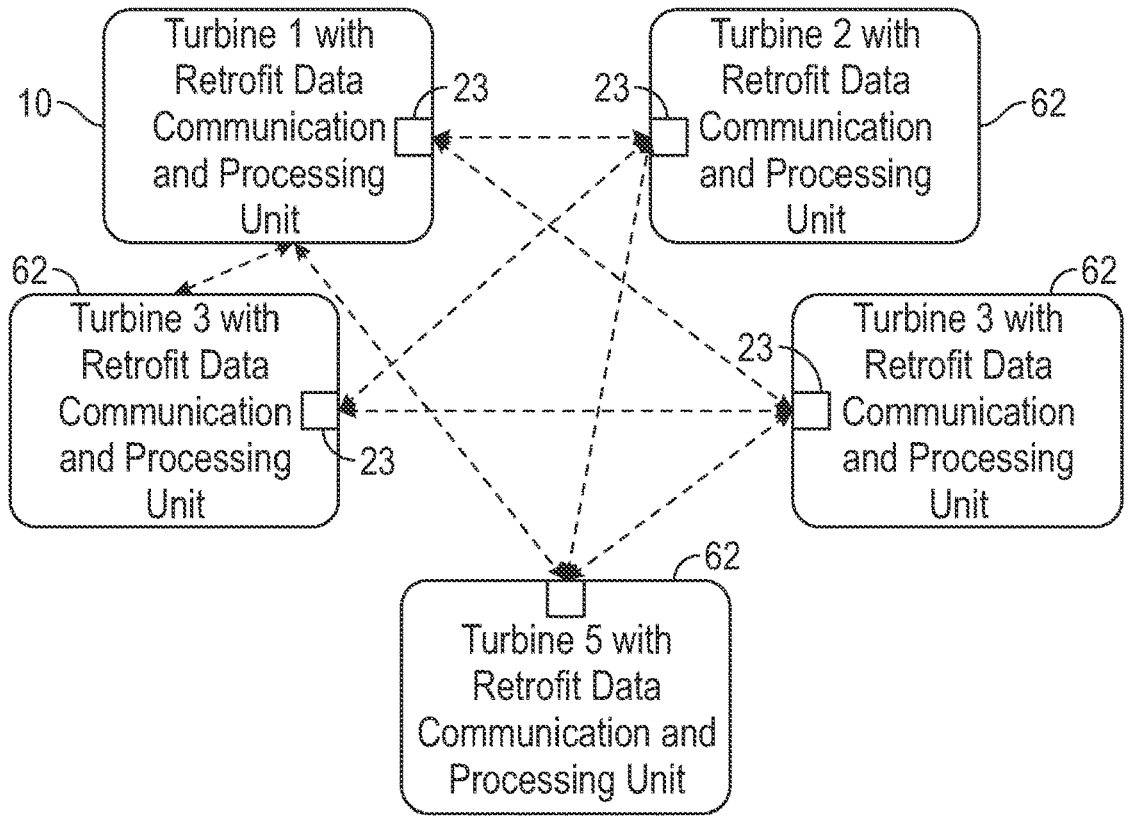
FIG. 10 is a schematic of an exemplary embodiment of a decentralized wind plant optimization scheme where each retrofit data communication and processing unit communicates with every other retrofit data communication and processing unit and based on the signals from each turbine determines the optimum position to drive its respective turbine to for the benefit of the overall wind plant.
Figure 11:
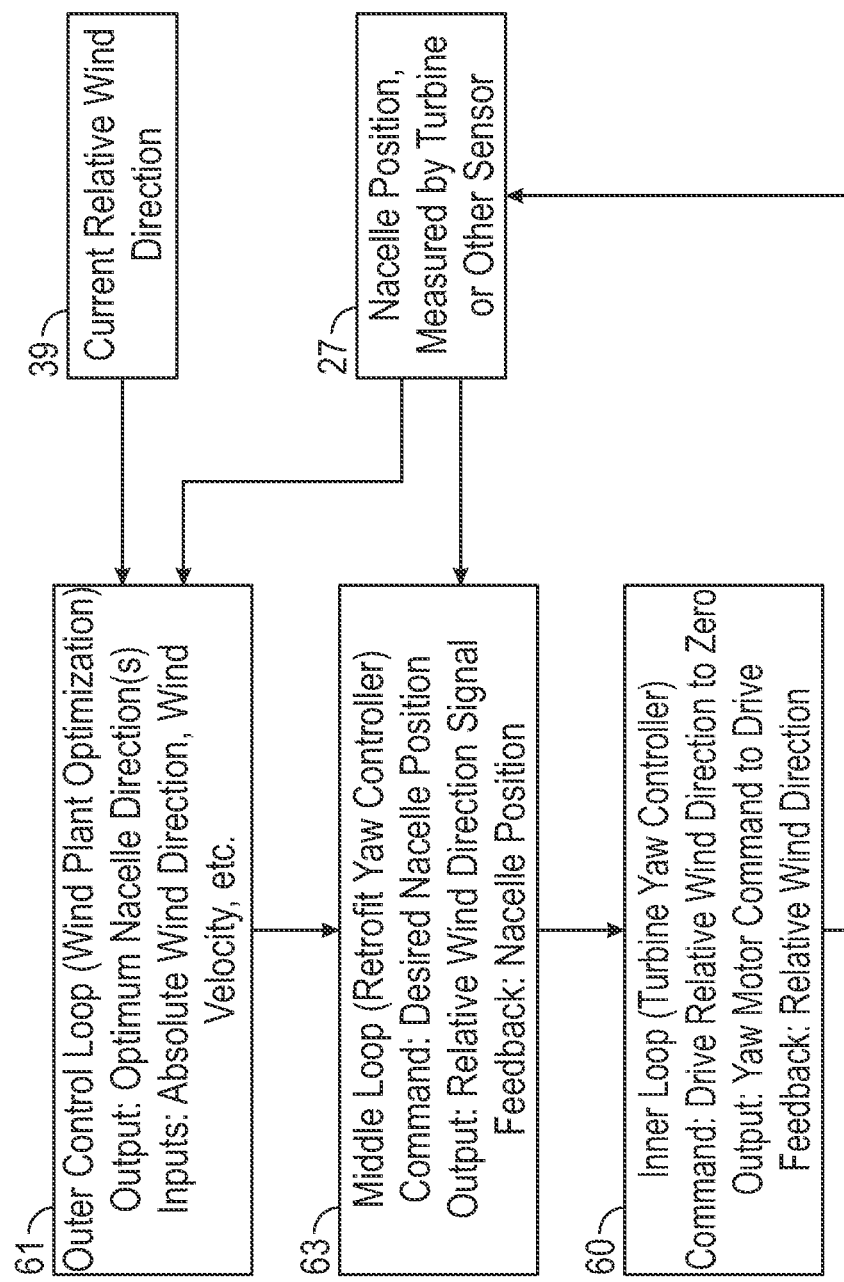
FIG. 11 is a flow chart of an exemplary embodiment of a control process showing the different control loop levels in the overall control.

Referring to FIGS. 8-11, an exemplary wind plant optimization control process implemented as an outer control loop 61 responds relatively slowly to global changes in wind direction and determines the optimum nacelle yaw position for each turbine 10. This wind plant optimization control process may be incorporated into the retrofit data communication and processing unit 23 or it may be a separate system that provides the desired nacelle yaw position to the retrofit data communication and processing unit 23. A separate control process then incorporates a middle loop 63 controller (FIG. 11). A middle loop 63 provides a wind direction signal to cause an inner loop 60 to drive the nacelle yaw position to that target nacelle yaw position. An inner loop control process is the current turbine control unit 24 in the turbine 10 prior to the installation of the retrofit system 20 and drives the nacelle 14 to a position where the relative wind direction signal 39 approaches zero.

Approaches for wind farm yaw optimization control systems have been described elsewhere herein and, in general, incorporate the wind direction as determined from one or more nacelle-mounted wind sensors 22 and the nacelle yaw position of those turbines 10 as well as the wind speed. Data from sensors 22 on the turbine 10 as well as from other sources may be combined to achieve the best possible information about the wind throughout the wind plant 1. Other signals such as the power output of each turbine 10 may also be used to adjust the optimization should a turbine 10 be shut down or curtailed.

An exemplary approach is to use a lookup table for wind speed and direction to identify a predetermined desired nacelle yaw position for each turbine 10. More complex processes may also be applied that further optimize the plant performance based on localized difference in wind direction, rate of change of wind direction, and so forth. The optimization 64 may operate in a closed loop fashion where the prediction capability and thus the optimized solution improves over time by accounting for the data collected. This optimization also needs to account for turbines 10 that are offline, curtailed to reduce power output or are operating, but are not controllable. This may be detected from the power signals and state of the retrofit data communication and processing unit 23 but additional signals such as turbine state may also be incorporated.

Determination of the desired nacelle yaw position may occur outside the retrofit data communication and processing unit 23, or it may be incorporated into its capabilities. The wind plant optimization controller 64 may be implemented on a separate centralized controller (FIG. 9) or may be implemented as a distributed control scheme (FIG. 10)

where each retrofit data communication and processing unit 23 communicates the key information with the other systems and determines the optimum position for the turbine it is controlling based on those results. This distributed control may be configured to continue functioning even if communication to one or more of the retrofit data communication and processing units 23 is lost.

Exemplary embodiments improve a control loop 63 by observing the turbine control unit 24 response to relative wind direction signals 39 as a function of time and, from these observations, modeling the behavior of the turbine control unit 24 to determine a series of virtual wind direction signals 26 to efficiently move the nacelle 14 to the desired nacelle yaw position 29. For the middle loop 63 to perform optimally, a system identification of the existing turbine control unit 24 (inner loop 60) should be performed. This may be conducted experimentally by setting different relative wind direction inputs and observing the results, or it may be conducted using data collected over a period of normal operation of the turbine 10 using the variation from the wind direction.

Another application of exemplary embodiments includes preventing unnecessary yawing of a turbine 10 when the wind is not sufficient to start generating power. Wind turbines 10 consume energy to yaw in light wind conditions, and when an entire wind plant 1 activates its yaw drives simultaneously in light wind the power consumption can be considerable. With the auxiliary retrofit yaw control system 20 installed, only a few sentry turbines 10 are rotated to face the wind until they have sufficiently strong wind to start generating power. Then the remaining turbines are gradually yawed to face the wind and start producing power. In this way the energy consumption of the wind plant 1 may be reduced during periods of light wind.

A third application is to install the retrofit yaw control system 20 temporarily to do a system identification and tuning optimization of the turbine control unit 24 process in the TCU. The turbine control unit 24 is intended to keep the rotor 16 pointed into the wind based on feedback measured from a wind vane or sonic anemometer(s) on the back of the nacelle 14. The challenge is that with many wind plants, the turbine control unit algorithms or source code are not available to the plant owner or to a third party that seeks to optimize the settings. While turbine OEMs have developed and tuned the turbine control unit 24 for a generic site, those settings are not necessarily optimum when one considers the typical conditions at wind plants in with greater or less turbulence than the generic site. If the turbine control unit 24 is too active, it will wear out yaw drive components quickly. It may also continuously overshoot—moving to catch up to a shift in wind direction just before the wind shifts back to where it was before. If it is not active enough then significant energy production is lost because the turbine will operate at larger relative wind direction magnitudes than necessary and in some cases may even suffer from threshold shutdown events when the relative wind direction becomes too large, further reducing production.

While it is possible to tune a turbine control unit 24 by trial and error, this takes a long time and may not provide optimal results. Some settings may drastically reduce the performance of the turbine 10. Instead, disclosed embodiments determine the optimum parameters for the turbine control unit 24 in a simulated environment using real historical high speed wind direction data measured on the turbines 10. Then those parameters can be entered directly to provide optimum performance. To do this, we need an accurate model or simulation of the response of the turbine control unit 24 as a function of the input relative wind direction signal, the wind speed, and the adjustable parameters. This application provides a method for experimentally building a numerical model of the turbine control unit 24 that can be used to optimize the parameters for a particular turbine 10 or wind plant 1.

While turbine control unit yaw position control operates slowly, the input signals are typically high frequency (10-25 Hz). These signals are then filtered in some way. Unfortunately, for most turbines the raw input is not recorded and may or may not have the required filtered signals available in the SCADA data set. As the data is sampled slowly (often 10 or 20 second intervals) it can be impossible to develop a model to predict the performance of the turbine control unit 24 and corresponding nacelle yaw position as a function of time. Also, data for the turbine control unit 24 with different parameters is not available. Thus, it is desirable to run a set of controlled experiments with known inputs and various permutations of the relevant parameters in a short period of time.

An exemplary approach is to use the retrofit data communication and processing unit 23 previously described to feed virtual relative wind direction and wind speed signals to the turbine control unit 24 and measure response. A GUI and/or wizard-like interface may be provided for running these experiments, including displaying and recording the parameters values which likely must also be manually entered in the turbine control unit 24 before each run. The device can be configured to measure yaw response directly rather than relying on SCADA data. This could be done using an IMU or differential GNSS or a combination. A gyroscope can be used to measure the yaw system acceleration, which relates to forces on components and therefore their wear.

In exemplary embodiments, the relative wind direction signals 39 and wind speed signals are disconnected from the turbine control unit 24. Then a series of virtual wind direction signals 26 are introduced into the turbine control unit 24 and the nacelle yaw position responses to the virtual wind direction signals 26 are measured. Based on these responses, the parameters of the turbine control unit 24 can be modified to optimize performance. The series of virtual wind direction signals 26 can be repeatedly sent to the turbine control unit 24. Exemplary embodiments predict the nacelle yaw position responses as a function of the series of virtual wind direction signals 26 and the parameters of the turbine control unit 24. As discussed herein, the response of the nacelle 14 can be measured by SCADA data, gyroscopes, accelerometers, differential GNSS or any combination of these. Exemplary embodiments automatically generate a number of parameter cases to be run so parameter space is covered with a minimum number of steps. The accumulated historical operation data allows performance of optimization to reduce nacelle yaw position movements and minimize the magnitude of the relative wind direction during operation.

Figure 13:
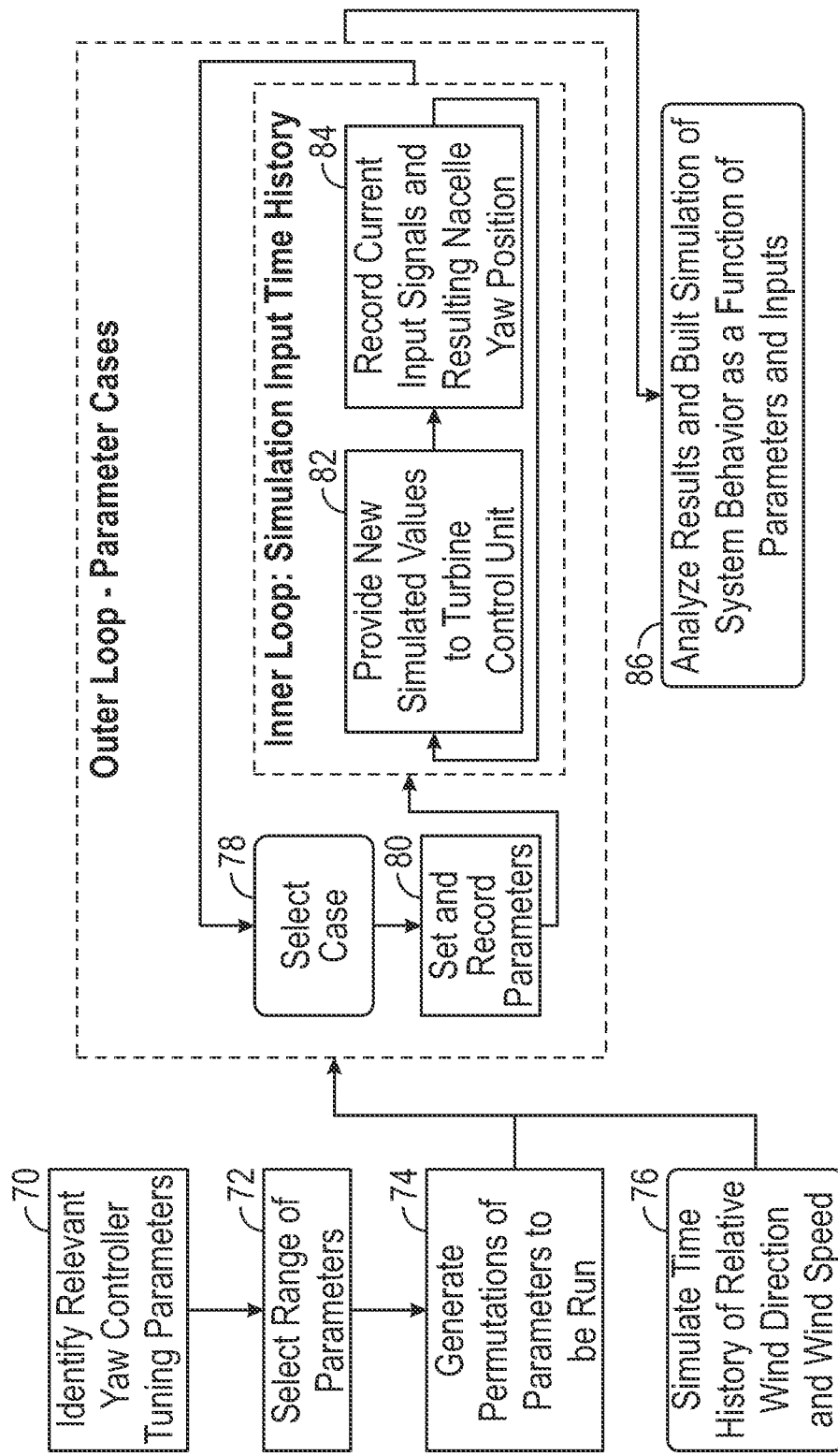
FIG. 13 is a flow chart of an exemplary method used to identify the turbine data communication and processing unit nacelle yaw position behavior as a function of its parameters through synthetic input and subsequent analysis.
Figure 14:
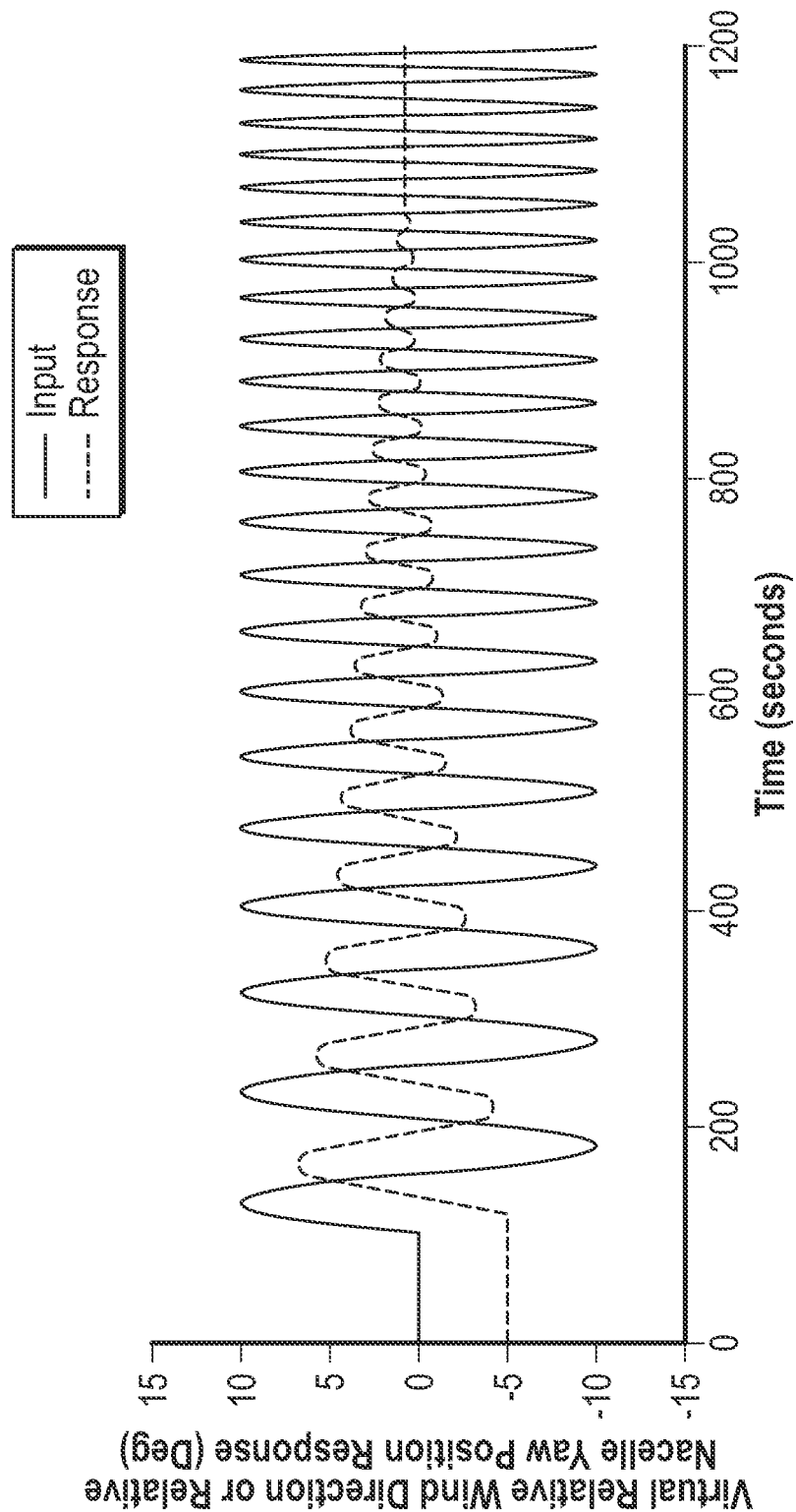
FIG. 14 is an example of waveforms for sinusoidal variable frequency input virtual relative wind direction signal and a simple non-linear response nacelle yaw position.
Figure 15:
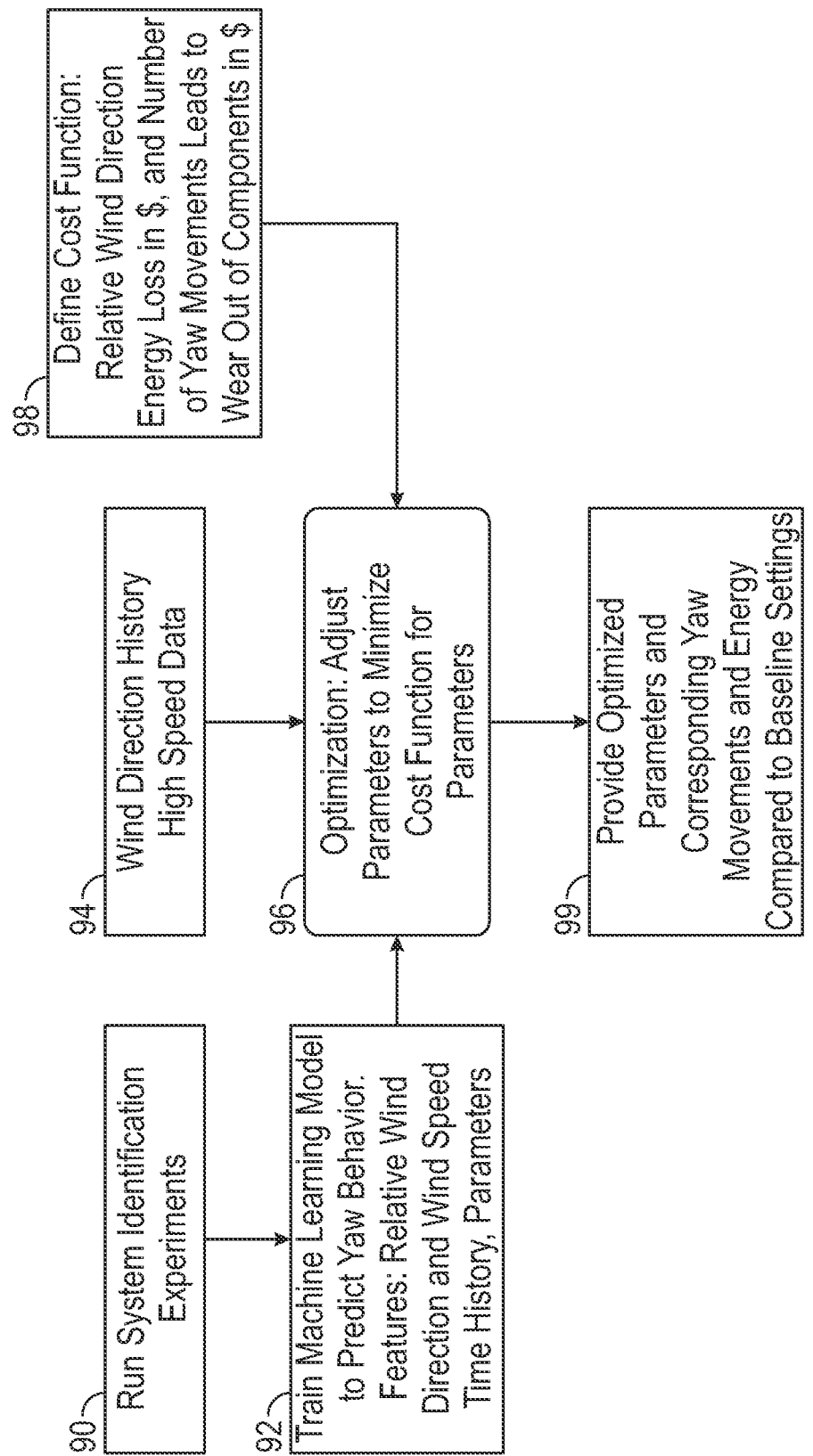
FIG. 15 is a flow chart showing an exemplary embodiment of a turbine control unit parameter optimization process for nacelle yaw position control in accordance with the present disclosure.

Exemplary optimization methods are shown in FIGS. 13-15 and may be described in the following steps:

Install the retrofit system 20 and ensure that turbine control unit 24 is correctly communicating (this requires the system to behave communicatively exactly like the wind sensor 22 typically used by the turbine 10). The methods involve running 90 system identification experiments. If the turbine 10 is to be run during the experiments, then the real relative wind direction and wind speed would be measured by the retrofit system 20 and the output virtual relative wind direction signal adjusted to keep the actual relative wind direction magnitude within a safe range during the experiment.

Typically, a variation of frequency, amplitude and perhaps waveform (FIG. 14) of the input signal is required to identify the system behavior. These trials may be run without the turbine 10 generating power or, if needed, with the turbine 10 generating power in relatively steady conditions. Frequency range should go from the low end when the turbine 10 moves with the input signal to the high end where it does not move at all. In exemplary embodiments, the wind turbine 10 is running during performance of the method and true relative wind direction is kept within a predetermined range.

Identify 70 the relevant turbine control unit nacelle yaw position parameters and select the range of parameters. Generate (step 74) permutations of the parameters to be run and simulate 76 time history of relative wind direction and wind speed signals, including providing (step 82) new simulated values to the turbine control unit. Select 78 the case and set and record 80 the parameters, including recording 84 the current input signals and resulting nacelle yaw position. Repeat for various permutations of the available parameters. Record 80 each run input and nacelle yaw position response along with the turbine control unit 24 parameters used. For a given turbine control unit 24, it may be possible to determine ahead of time the optimum combinations of parameters to run to model the turbine control unit 24 in a minimum number of experimental runs. Random sampling algorithms such as Latin hypercube sampling can be used to minimize the number of experiment iterations while capturing the essence of the control behavior.

Develop the process to accurately predict the resulting nacelle movement as a function of the input parameters and relative wind direction signal. This could be a machine learning model trained 92 based on these results to generate a numerical prediction of nacelle movement or in some cases an analytical model may be derived that provides an accurate prediction of the nacelle yaw position response.

Build and run 96 optimization simulation using actual plant data set 94 to determine optimum parameters 99—can include cost function 98 for yaw drive wear along with energy production as part of total optimization for revenue.

Once an accurate model of the turbine control unit 24 as a function of its parameters is defined, the turbine control unit 24 may alternatively be optimized 99 to provide the best performance in combination with the wind plant controller 64 and middle control loop 63 on nacelle yaw position. As long as adequate performance is still achieved when the turbine 10 is operating without the relay activated to introduce the retrofit data communication and processing unit 23 then superior performance with the retrofit data communication and processing unit 23 will yield superior performance of the entire wind farm 1 when all systems are operating normally.

Potential variations of disclosure embodiments relate to input signals. For example, it is possible that other input signals will be used in the turbine control unit 24 and may be simulated and modeled in the application of these methods. These could include turbulence intensity (the variability of windspeed), temperature, power limit (curtailment level), etc. Various test conditions, i.e., the turbine could be running or in standby during the system identification. If running, then care must be taken that the actual relative wind direction does not become too large. For scanning input signals, automated sequences or manual testing could be employed. The method of measuring yaw response during characterization testing could include, but is not limited to, SCADA data, IMU, differential GPS, or some combination thereof. Optimization can be done for a particular turbine or site and for typical conditions during a portion of the year or over one or more entire years.

Exemplary embodiments use edge computing and distributed resource control for yaw control of wind farms 1 to facilitate wake steering and power output optimization. These systems may communicate with each other over either a wired or wireless network communication system. This advantageously improves the power output across an entire wind farm 1 by coordinating an individual turbine 10, avoiding the need for a single central wind plant optimization processor. If an upwind turbine compromises its power production slightly by adjusting its yaw angle to steer wakes away from downwind turbines, an increase in overall wind farm production is possible. If one or more of the distributed systems faults or goes down, then the remaining systems can continue to optimize the wind plant 1, thus providing robustness compared to a centralized controller.

Figure 12:
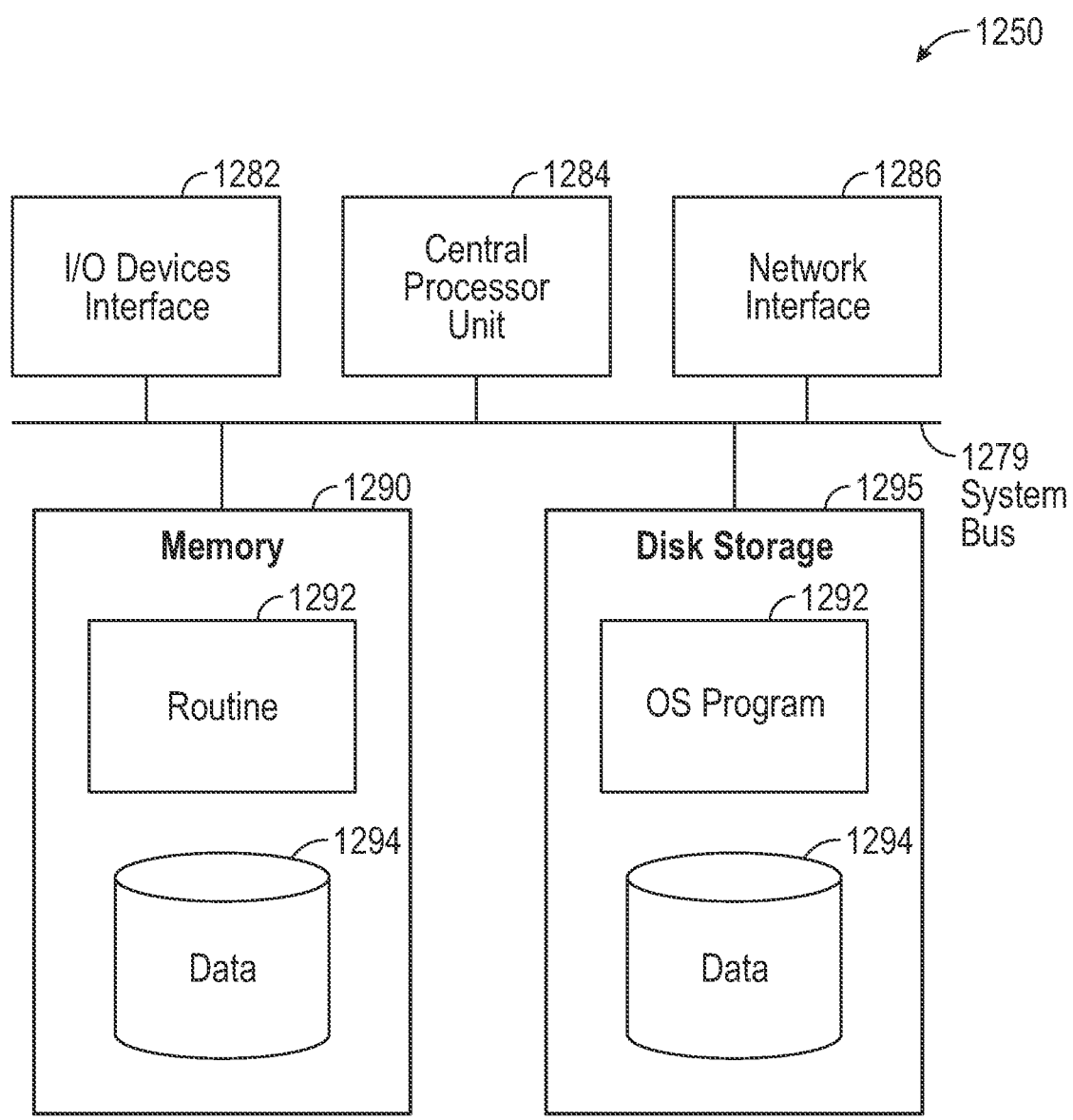
FIG. 12 is a block diagram showing an exemplary embodiment of the internal structure of a computer in which various embodiments of the disclosure may be implemented.

FIG. 12 shows an exemplary internal structure of a computer 1250 in which various embodiments of the present disclosure may be implemented. For example, the computer 1250 may act as a data analysis and augmented control system 20 as depicted in FIG. 3. The computer 1250 contains a system bus 1279, where a bus is a set of hardware lines used for data transfer among the components of a computer or processing system. Bus 1279 is essentially a shared conduit that connects different elements of a computer system (e.g., processor, disk storage, memory, input/output ports, network ports, etc.) that enables the transfer of information between the elements. Attached to system bus 1279 is I/O device interface 1282 for connecting various input and output devices (e.g., sensors, transducers, keyboard, mouse, displays, printers, speakers, etc.) to the computer 1250. Network interface 1286 allows the computer 1250 to connect to various other devices attached to a network (e.g., wind farm system 130, SCADA system, wind farm controller, individual turbine control units, weather condition sensors, data acquisition system etc.).

Memory 1090 provides volatile storage for computer software instructions 1292 (e.g., instructions for the processes/calculations described above, for example, receiving operating state information from the wind farm system and sensor data from the blade sensors to calculate cyclic loads, the processes for cycle counting, calculating the cyclic loads, determining the cyclic loading's effect on the life span of a wind turbine or specific component thereof, the bending moment calculations and calibration calculations) and data 1294 used to implement an embodiment of the present disclosure. Disk storage 1295 provides non-volatile storage for computer software instructions 1292 and data 1294 used to implement an embodiment of the present disclosure. Central processor unit 1284 is also attached to system bus 1279 and provides for the execution of computer instructions.

In an exemplary embodiment, the processor routines 1292 (e.g., instructions for the processes/calculations described above) and data 1094 are a computer program product (generally referenced 1292), including a computer readable medium (e.g., a removable storage medium such as one or more DVD-ROMs, CD-ROMs, diskettes, tapes, etc.) that provides at least a portion of the software instructions for the invention system. Computer program product 1292 can be installed by any suitable software installation procedure, as is well known in the art.

In another embodiment, at least a portion of the software instructions may also be downloaded over a cable, communication and/or wireless connection. Further, the present embodiments may be implemented in a variety of computer architectures. The computer of FIG. 12 is for purposes of illustration and not limitation of the present invention. In some embodiments of the present disclosure, the data analysis and augmented control system may function as a computer to perform aspects of the present disclosure.

Thus, it is seen that advanced yaw control systems and methods are provided. It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein. Embodiments may therefore typically be implemented in hardware, firmware, software, or any combination thereof.

While embodiments of the disclosure have been particularly shown and described with references to example embodiments thereof, it will be understood by those skilled in the art that various changes in form and details may be made therein without departing from the scope of the invention encompassed by the appended claims. For example, the disclosed augmented control is described in the context of wind farms and wind turbines, but may be applied to augment control of other turbines, such underwater turbines.

What is claimed is:

1. A retrofit system for a wind turbine including a tower, a nacelle mounted to the top of the tower, a turbine control unit, and one or more wind direction sensors attached to the wind turbine, the retrofit system comprising:
   a retrofit data communication and processing unit configured to be communicatively coupled to the turbine control unit;
   wherein the retrofit data communication and processing unit receives a first signal representing an initial nacelle yaw position of the nacelle relative to the tower and a second signal representing a desired nacelle yaw position of the nacelle relative to the tower;
   wherein the retrofit data communication and processing unit provides auxiliary control over the wind turbine by disconnecting a relative wind direction signal traveling between the one or more wind direction sensors and the turbine control unit, determining a virtual relative wind direction signal from the current nacelle yaw position and the desired nacelle yaw position, the virtual relative wind direction signal causing the turbine control unit to drive the nacelle to the desired nacelle yaw position, and sending the virtual relative wind direction signal to the turbine control unit instead of the relative wind direction signal.

2. The retrofit system of claim 1 wherein when the system detects a sensor or communication fault or a power failure, the retrofit data communication and processing unit communicatively couples the one or more wind direction sensors directly to the turbine control unit such that the relative wind direction signal is sent to the turbine control unit.

3. The retrofit system of claim 1 wherein the one or more wind direction sensors continue to monitor relative wind direction after the relative wind direction signal is disconnected from the turbine control unit.

4. The retrofit system of claim 1 wherein the wind turbine further comprises one or more windspeed sensors connected to the wind turbine;
   wherein the retrofit data communication and processing unit intercepts and receives windspeed signals from the windspeed sensor.

5. The retrofit system of claim 4 wherein if one or both of the wind direction sensors or windspeed sensors fail, the retrofit data communication and processing unit enables the wind turbine to continue operation using outside signals generated by additional wind turbines or additional sensors, the outside signals being provided by the retrofit data communication and processing unit to the turbine control unit as virtual sensor signals.

6. The retrofit system of claim 1 further comprising two or more GNSS antennas and a differential GNSS receiver attached to the wind turbine;
   wherein the initial nacelle yaw position is determined using the differential GNSS receiver to calculate a relative position vector between the two or more GNSS antennas.

7. A method of providing enhanced yaw control for a wind turbine including a tower, a nacelle mounted to the top of the tower, a turbine control unit, and one or more wind direction sensors attached to the wind turbine, the method comprising:
   receiving a first signal representing an initial nacelle yaw position of the wind turbine;
   receiving a second signal representing a desired nacelle yaw position of the wind turbine;
   disconnecting a relative wind direction signal traveling between the one or more wind direction sensors and the turbine control unit;
   determining a virtual relative wind direction signal from the current nacelle yaw position and the desired nacelle yaw position without taking into account the disconnected relative wind direction signal, the virtual relative wind direction signal cuasing the turbine control unit to drive the nacelle to the desired nacelle yaw position; and
   sending the virtual relative wind direction signal to the turbine control unit instead of the relative wind direction signal such that the turbine control unit drives the nacelle to the desired nacelle yaw position.

8. The method of claim 7 wherein when there is no signal received representing desired nacelle yaw position, the relative wind direction signal from the one or more wind direction sensors is provided directly to the turbine control unit such that the wind turbine returns to the initial nacelle yaw position.

9. The method of claim 7 further comprising disconnecting a wind velocity signal traveling to the turbine control unit and providing a virtual wind velocity signal to the turbine control unit.

10. The method of claim 7 wherein the virtual relative wind direction signal is determined using a circular difference between the initial nacelle yaw position and the desired nacelle yaw position.

11. The method of claim 7 further comprising automatically improving a control loop.

12. The method of claim 7 wherein the desired nacelle yaw position is determined using the relative wind direction signal, a wind speed signal, and the first signal representing the initial nacelle yaw position.

13. The method of claim 7 further comprising incorporating operating condition data from one or both of: a plurality of additional wind turbine assemblies and a plurality of additional sensors to determine the desired nacelle yaw position.

14. The method of claim 7 further comprising preventing yawing of the wind turbine when the wind is not sufficient to generate power.

15. The method of claim 7 wherein the initial nacelle yaw position is determined using two or more GNSS antennas and a differential GNSS receiver to calculate a relative position vector between the two or more GNSS antennas.

16. The method of claim 7 further comprising analyzing data from GNSS antennas and a differential GNSS receiver in combination with the first signal representing the initial nacelle yaw position to estimate the initial nacelle yaw position.

* * * * *